US012795011B2

(12) United States Patent
Kim et al.

(10) Patent No.: US 12,795,011 B2
(45) Date of Patent: Nov. 10, 2026

(54) SPEAKER ASSEMBLY AND ELECTRONIC DEVICE INCLUDING THE SAME

(71) Applicant: Samsung Electronics Co., Ltd., Suwon-si (KR)

(72) Inventors: Taeeon Kim, Suwon-si (KR); Hunki Lee, Suwon-si (KR); Kiwon Kim, Suwon-si (KR); Choonghyo Park, Suwon-si (KR); Seongkwan Yang, Suwon-si (KR); Byounghee Lee, Suwon-si (KR); Woojin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 18/776,853

(22) Filed: Jul. 18, 2024

(65) Prior Publication Data

US 2025/0030790 A1 Jan. 23, 2025

Related U.S. Application Data

(63) Continuation of application No. PCT/KR2024/010381, filed on Jul. 18, 2024.

(30) Foreign Application Priority Data

Jul. 18, 2023 (KR) ........................ 10-2023-0093004
Jul. 20, 2023 (KR) ........................ 10-2023-0094913

(51) Int. Cl.

*H04M 1/03* (2006.01)
*H04R 1/28* (2006.01)
*H04R 1/32* (2006.01)

(52) U.S. Cl.

CPC .......... *H04M 1/035* (2013.01); *H04R 1/2811* (2013.01); *H04R 1/323* (2013.01); *H04R 2400/11* (2013.01); *H04R 2499/11* (2013.01)

(58) Field of Classification Search

CPC .. H04R 1/2811; H04R 1/323; H04R 2400/11; H04R 2499/11; H04M 1/035
See application file for complete search history.

(56) References Cited

U.S. PATENT DOCUMENTS

2017/0149942 A1 5/2017 Lee et al.
2017/0245032 A1 8/2017 Yoon et al.
(Continued)

FOREIGN PATENT DOCUMENTS

CN 210202000 U 3/2020
CN 213126091 U 5/2021
(Continued)

OTHER PUBLICATIONS

International Search report dated Oct. 21, 2024, issued in International Application No. PCT/KR2024/010381.
(Continued)

*Primary Examiner* — Sunita Joshi
(74) *Attorney, Agent, or Firm* — Jefferson IP Law, LLP

(57) ABSTRACT

An electronic device is provided. The electronic device includes a housing including a first speaker hole and a speaker assembly disposed in the housing and configured to radiate a sound to an outside of the electronic device through the first speaker hole, wherein the speaker assembly includes a speaker including a diaphragm, a first speaker cover facing the diaphragm and spaced apart from the diaphragm, a sound space formed between the diaphragm and the first speaker cover, a first supporting structure including a first portion formed to surround a portion of the sound space, and a step structure disposed adjacent to an area where a portion of the first portion of the first supporting structure contacts the first speaker cover and disposed to be spaced apart from the speaker.

18 Claims, 17 Drawing Sheets

(56) References Cited

U.S. PATENT DOCUMENTS

| | | | | |
|---|---|---|---|---|
| 2017/0347184 | A1 | 11/2017 | Oshima et al. | |
| 2017/0353783 | A1 | 12/2017 | Hou et al. | |
| 2018/0206354 | A1 | 7/2018 | Yoon et al. | |
| 2020/0177979 | A1 | 6/2020 | Cho et al. | |
| 2022/0167079 | A1* | 5/2022 | Kim ..................... | H04R 1/2811 |
| 2022/0225513 | A1 | 7/2022 | Jun et al. | |
| 2023/0188888 | A1 | 6/2023 | Park et al. | |

FOREIGN PATENT DOCUMENTS

| | | | |
|---|---|---|---|
| CN | 214901288 | U | 11/2021 |
| CN | 215040822 | U | 12/2021 |
| KR | 10-2001-0102901 | A | 11/2001 |
| KR | 10-2011-0090697 | A | 8/2011 |
| KR | 10-2013-0040616 | A | 4/2013 |
| KR | 10-2017-0098009 | A | 8/2017 |
| KR | 10-2021-0123510 | A | 10/2021 |
| KR | 10-2022-0050599 | A | 4/2022 |
| KR | 10-2022-0069367 | A | 5/2022 |
| KR | 10-2399550 | B1 | 5/2022 |
| KR | 10-2022-0102321 | A | 7/2022 |
| WO | 2022/030935 | A1 | 2/2022 |

OTHER PUBLICATIONS

European Search Report dated Jun. 2, 2026, issued in European Application No. 24843529.9.

* cited by examiner

SPEAKER ASSEMBLY AND ELECTRONIC DEVICE INCLUDING THE SAME

CROSS-REFERENCE TO RELATED APPLICATION(S)

This application is a continuation application, claiming priority under § 365(c), of an International application No. PCT/KR2024/010381, filed on Jul. 18, 2024, which is based on and claims the benefit of a Korean patent application number 10-2023-0093004, filed on Jul. 18, 2023, in the Korean Intellectual Property Office, and of a Korean patent application number 10-2023-0094913, filed on Jul. 20, 2023, in the Korean Intellectual Property Office, the disclosure of each of which is incorporated by reference herein in its entirety.

TECHNICAL FIELD

The disclosure relates to a speaker assembly and an electronic device including the same.

BACKGROUND ART

With the development of information and communication technology and semiconductor technology, various functions are packed in one portable electronic device. For example, an electronic device may implement not only communication functions but also entertainment functions, such as playing games, multimedia functions, such as playing music and videos, communication and security functions for mobile banking, and scheduling or e-wallet functions. These electronic devices have been downsized to be conveniently carried by users.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide a speaker assembly and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first speaker hole and a speaker assembly disposed in the housing and configured to radiate a sound to an outside of the electronic device through the first speaker hole, wherein the speaker assembly includes a speaker including a diaphragm, a first speaker cover facing the diaphragm and spaced apart from the diaphragm, a sound space formed between the diaphragm and the first speaker cover, a first supporting structure including a first portion formed to surround a portion of the sound space, and a step structure disposed adjacent to an area where a portion of the first portion of the first supporting structure contacts the first speaker cover and disposed to be spaced apart from the speaker.

In accordance with another aspect of the disclosure, a speaker assembly is provided. The speaker assembly includes a speaker including a diaphragm, a first speaker cover facing the diaphragm and spaced apart from the diaphragm, a sound space formed between the diaphragm and the first speaker cover, a first supporting structure including a first portion formed to surround a portion of the sound space, and a step structure disposed adjacent to an area where a portion of the first portion of the first supporting structure contacts the first speaker cover and disposed to be spaced apart from the speaker.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include the plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
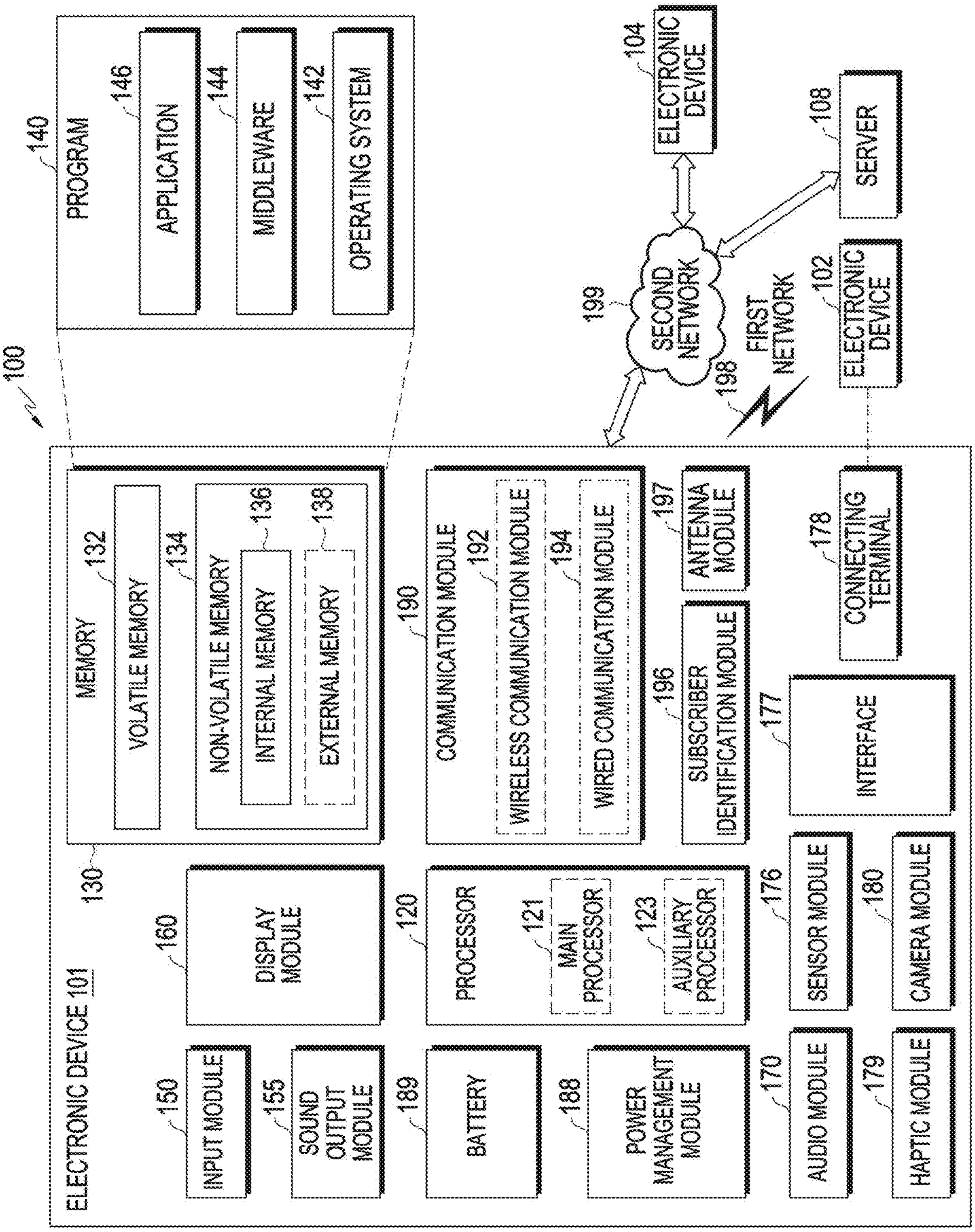
FIG. 1 is a block diagram illustrating an electronic device in a network environment according to an embodiment of the disclosure.

FIG. 1 is a block diagram illustrating an electronic device in a network environment according to an embodiment of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. In an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and performs various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data includes, for example, software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 includes, for example, a microphone, a mouse, a keyboard, keys (e.g., buttons), or a digital pen (e.g., a stylus pen).

The sound output module 155 may output sound signals to the outside of the electronic device 101. The sound output module 155 includes, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 includes, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 is implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips)

separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following detailed description, a length direction, a width direction, and/or a thickness direction of the electronic device may be mentioned and may be defined as a 'Y-axis direction,' 'X-axis direction', and/or 'Z-axis direction,' respectively. In an embodiment, 'negative/positive (−/+)' may be mentioned together with the Cartesian coordinate system exemplified in the drawings with respect to the direction in which the component is oriented. For example, the front surface of the electronic device or housing is defined as a 'surface facing in the +Z direction,' and the rear surface may be defined as a 'surface facing in the −Z direction'. In an embodiment, the side surface of the electronic device or housing may include an area facing in the +X direction, an area facing in the +Y direction, an area facing in the −X direction, and/or an area facing in the −Y direction. In another embodiment, the 'X-axis direction' may mean including both the '−X direction' and the '+X direction'. It should be noted that the directions are so defined with respect to the Cartesian coordinate system shown in the drawings for the sake of brevity of description, and the description of these directions or components do not limit an embodiment of the disclosure. For example, the direction in which the front surface or rear surface faces is varied depending on the unfolded state or folded state of the electronic device, and the above-mentioned directions may be interpreted as different ones depending on the user's way to grip.

Figure 2:
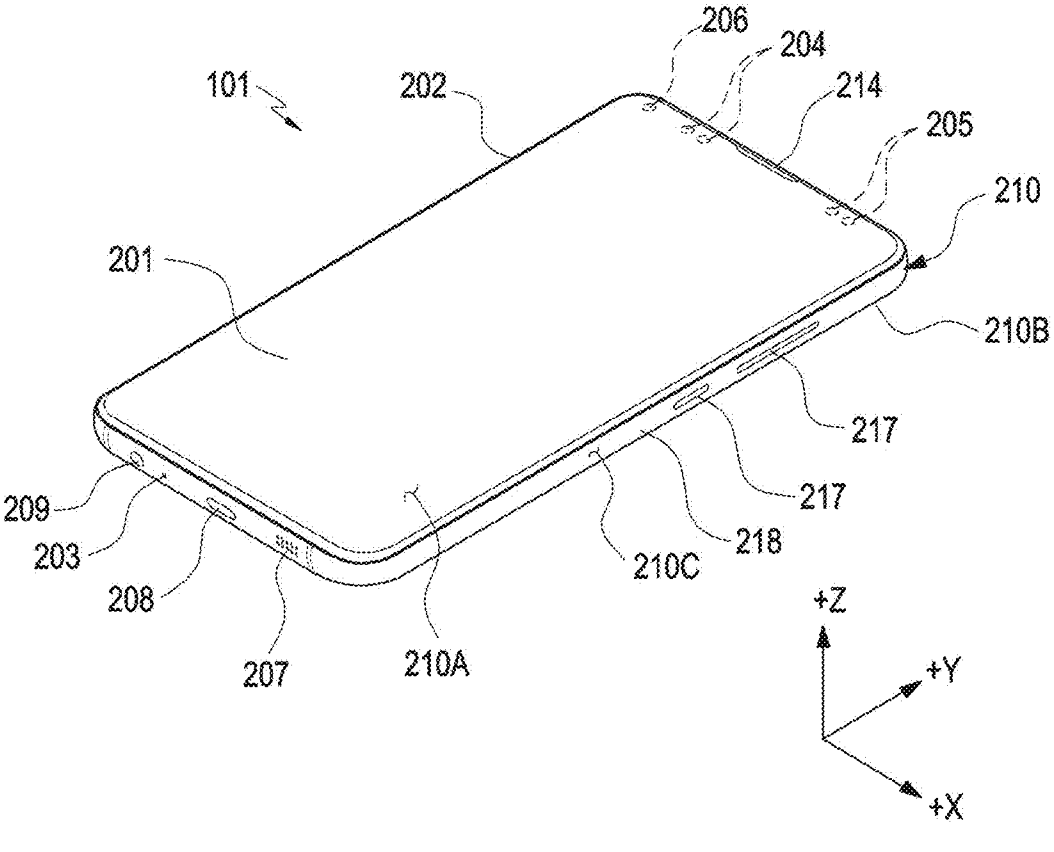
FIG. 2 is a front perspective view illustrating an electronic device according to an embodiment of the disclosure.
Figure 3:
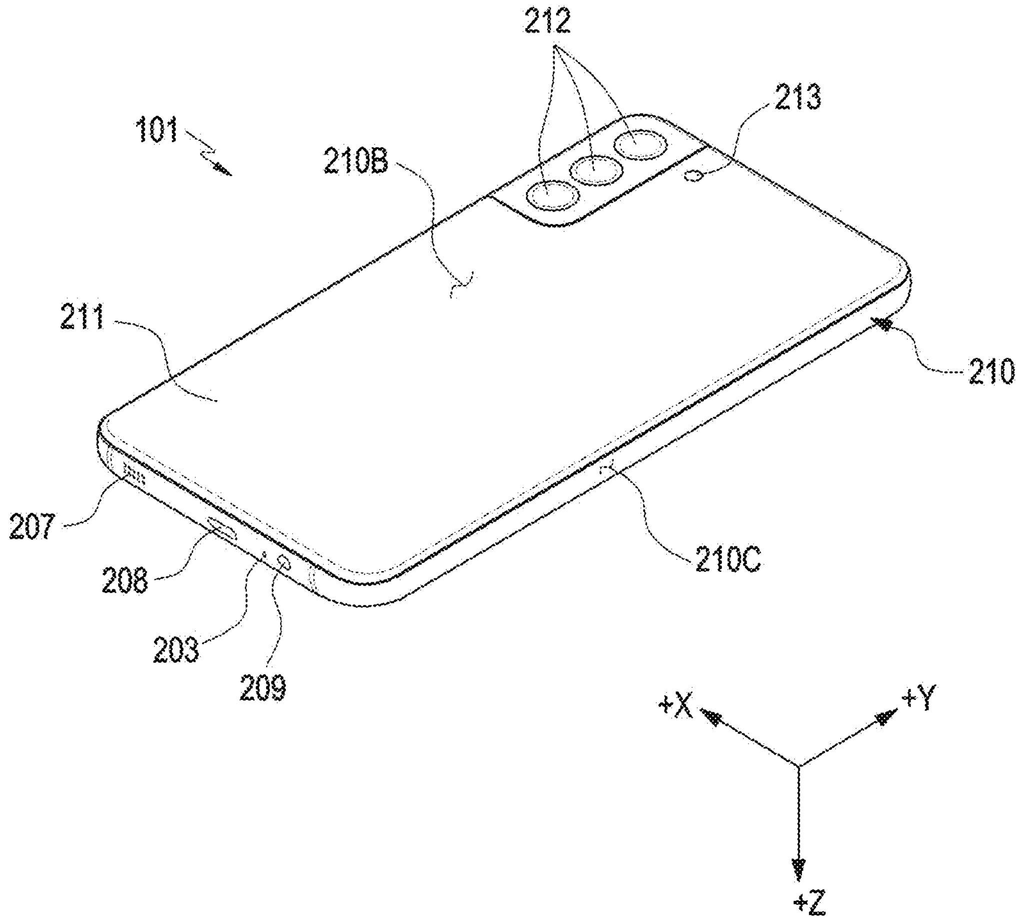
FIG. 3 is a rear perspective view illustrating an electronic device according to an embodiment of the disclosure.

FIG. 2 is a front perspective view illustrating an electronic device according to an embodiment of the disclosure. FIG. 3 is a perspective view illustrating a rear surface of the electronic device of FIG. 2 according to an embodiment of the disclosure. The configuration of the electronic device 101 of FIGS. 2 and 3 may be identical in whole or part to the configuration of the electronic device 101 of FIG. 1.

Referring to FIGS. 2 and 3, according to an embodiment, an electronic device 101 may include a housing 210 including a first side (or front surface) 210A, a second side (or rear surface) 210B, and a side surface 210C surrounding the space between the first surface 210A and the second surfaces 210B. According to an embodiment (not illustrated), the housing 210 may denote a structure forming the first surface 210A of FIG. 2, the second surface 210B of FIG. 3, and some of the side surfaces 210C. According to an embodiment, at least part of the first surface 210A may have a substantially transparent front plate 202 (e.g., a glass plate or polymer plate including various coat layers). The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side structure (or "side bezel structure") 218 that couples to the front plate 202 and the rear plate 211 and includes a metal and/or polymer. In an embodiment, the rear plate 211 and the side structure 218 may be integrally formed together and include the same material (e.g., a metal, such as aluminum).

Although not shown, the front plate 202 may include area(s) that bend from at least a portion of an edge toward the rear plate 211 and seamlessly extend. In an embodiment, only one of the areas of the front plate 202 (or the rear plate 211), which bend to the rear plate 211 (or front plate 202) and extend may be included in one edge of the first surface 210A. According to an embodiment, the front plate 202 or rear plate 211 may be substantially flat and, in this case, may not include an area bending and extending. When an area bending and extending is included, the thickness of the electronic device 101 at the portion including the area bending and extending may be smaller than the thickness of the rest.

According to an embodiment, the electronic device 101 may include at least one of a display 201, an audio module (not illustrated) (e.g., the audio module 170 of FIG. 1) including at least one sound hole 203, 207, and 214, a sensor module 204 (e.g., the sensor module 176 of FIG. 1), camera modules 205, 212, and 213 (e.g., the camera module 180 of FIG. 1), a key input device 217 (e.g., the input module 150 of FIG. 1), or connector holes 208 and 209 (e.g., the connecting terminal 178 of FIG. 1). In an embodiment, the electronic device 101 may exclude at least one (e.g., the key input device 217 or the light emitting device 206) of the components or may add other components.

According to an embodiment, the display 201 may be visually revealed through, e.g., a majority portion of the front plate 202. In an embodiment, at least a portion of the display 201 may be visually exposed through the front plate 202 forming the first surface 210A, or through a portion of the side surface 210C. In an embodiment, the edge of the display 201 may be formed to be substantially the same in shape as an adjacent outer edge of the front plate 202. In an embodiment (not illustrated), the interval between the outer edge of the display 201 and the outer edge of the front plate 202 may remain substantially even to give a larger area of visual exposure of the display 201.

In an embodiment (not illustrated), the screen display area of the display 201 may have a recess or opening in a portion thereof, and at least one or more of the sound hole 214, sensor module 204, camera module 205, and light emitting device 206 may be aligned with the recess or opening. In an embodiment (not illustrated), at least one or more of the sound module 214, sensor module 204, camera module 205, fingerprint sensor (not illustrated), and light emitting device 206 may be included on the rear surface of the screen display area of the display 201. In an embodiment (not illustrated), the display 201 may be disposed to be coupled with, or adjacent, a touch detecting circuit, a pressure sensor capable of measuring the strength (pressure) of touches, and/or a digitizer for detecting a magnetic field-type stylus pen. In an embodiment, at least a portion of the sensor module 204 and/or at least a portion of the key input device 217 may be disposed on the side surface 210C.

According to an embodiment, the audio module (not illustrated) may include a microphone hole 203 and speaker holes 207 and 214. A microphone for acquiring external sounds may be disposed in the microphone hole 203. In an embodiment, a plurality of microphones may be disposed to detect the direction of the sound. According to an embodiment, the speaker holes 207 and 214 may include an external speaker hole 207 and a phone receiver hole 214. In an embodiment, the speaker holes 207 and 214 and the microphone hole 203 may be implemented as a single hole, or without the sound holes 207 and 214, a speaker (e.g., a Piezo speaker) may be included in the audio module.

According to an embodiment, the sensor modules 204 may generate an electrical signal or data value corresponding to an internal operating state or external environmental state of the electronic device 101. The sensor module 204 may include, e.g., a first sensor module 204 (e.g., a proximity sensor) and/or a second sensor module (not illustrated) (e.g., a fingerprint sensor) disposed on the front surface (i.e., first surface 210A) of the housing 210. According to an embodiment, an additional sensor module may be disposed on the second surface 210B of the housing 210. The fingerprint sensor (not illustrated) may be disposed on the second surface 210B or side surface 210C as well as the first surface 210A (e.g., the display 201) of the housing 210. The electronic device 101 may further include, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 205, 212, and 213 may include a first camera module 205 facing the first surface 210A of the electronic device 101, and a second camera module 212 and/or a flash 213 facing the second surface 210B. For example, the first camera module 205 and/or the second camera module 212 includes one or more lenses, an image sensor, and/or an image signal processor. According to an embodiment, some camera module 205 of the camera modules 205 and 212 and/or some sensor module (e.g., the sensor module 204) may be disposed to be exposed to the outside through at least a portion of the display 201. According to an embodiment, the first camera module 205 may include a punch hole camera disposed inside a hole or recess formed in the rear surface of the display 201. For example, the first camera module 205 receives at least a portion of the light incident on the first surface 210A (or front surface) of the electronic device 101 through the display 201 inside the electronic device 101.

According to an embodiment, the second camera module 212 may be disposed inside the housing 210 so that the lens is exposed to the second surface 210B (or rear surface) of the electronic device 101. For example, the camera module 212 is electrically connected to the printed circuit board (e.g., the printed circuit board 240_a_ of FIG. 4). For example, the flash 213 includes a light emitting diode or a xenon lamp. In an embodiment, one or more lenses (an infrared (IR) camera, a wide-angle lens, and a telephoto lens) and image sensors may be disposed on one surface of the electronic device 101. In an embodiment, the flash 213 may radiate infrared light. For example, the infrared light radiated from the flash 213 and reflected by the object are received through the sensor module (not illustrated) disposed on the second surface 210B of the housing 210. The electronic device 101 or the processor (e.g., the processor 120 of FIG. 1) may detect depth information about the subject based on the time point when the infrared light is received from the third sensor module.

According to an embodiment, the key input device 217 may be disposed on the side surface 210C of the housing 210. In an embodiment, the electronic device 101 may exclude all or some of the above-mentioned key input devices 217 and the excluded key input devices 217 may be implemented in other forms, e.g., as soft keys, on the display 201. In an embodiment, the key input device may include the sensor module disposed on the second surface 210B of the housing 210.

According to an embodiment, the light emitting device 206 is disposed on the first surface 210A of the housing 210, for example. The light emitting device 206 provides, e.g., information about the state of the electronic device 101 in the form of light. In an embodiment, the light emitting device 206 may provide a light source that interacts with, e.g., the process of the camera module 205. The light emitting device 206 may include, e.g., a light emitting diode (LED), an infrared (IR) LED, or a xenon lamp.

According to an embodiment, the connector holes 208 and 209 may include, e.g., a first connector hole 208 for receiving a connector (e.g., a universal serial bus (USB) connector) for transmitting or receiving power and/or data to/from an external electronic device and/or a second connector hole (e.g., an earphone jack) 209 for receiving a connector for transmitting or receiving audio signals to/from the external electronic device.

Figure 4:
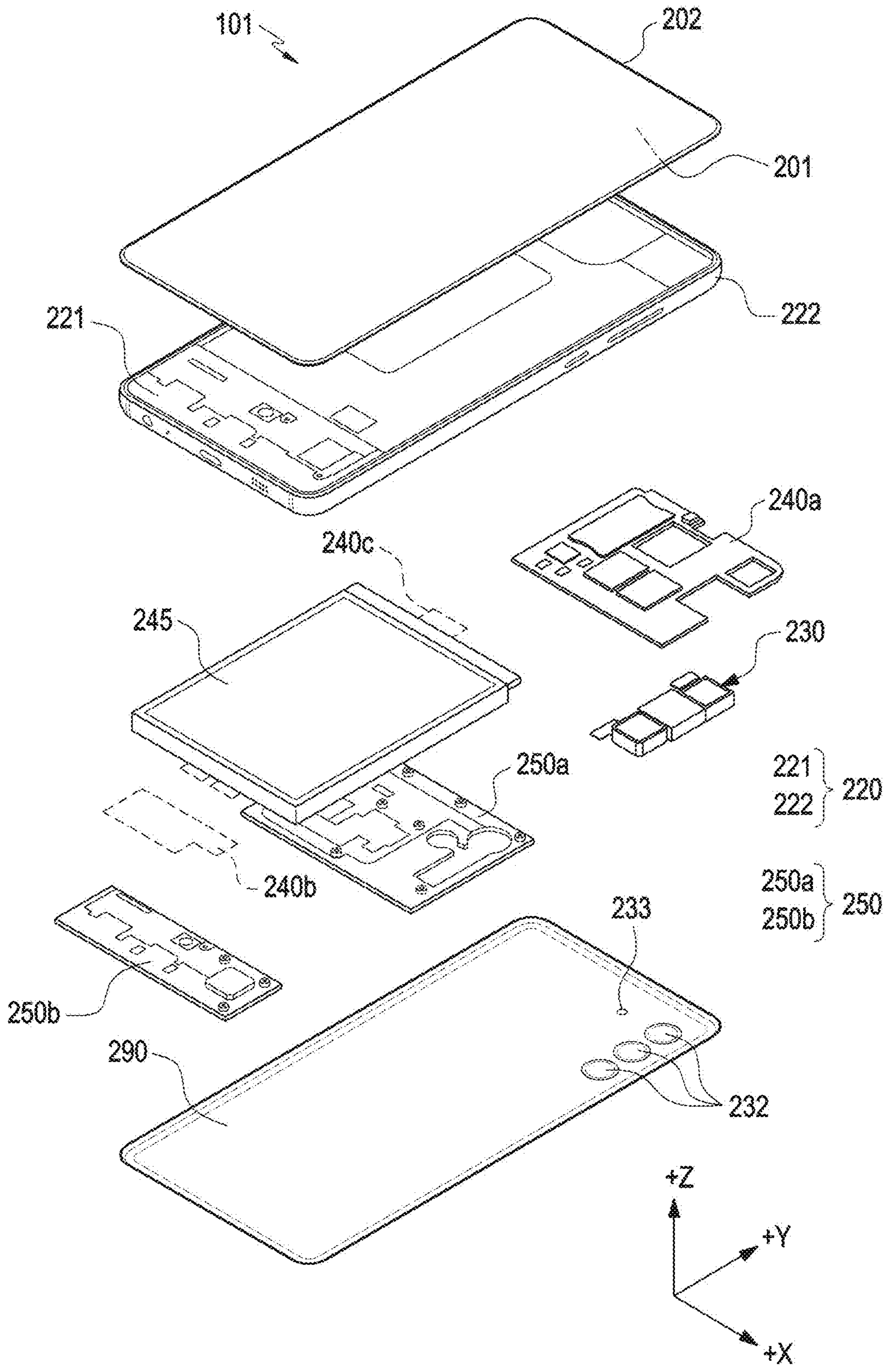
FIG. 4 is a front exploded perspective view illustrating an electronic device according to an embodiment of the disclosure.
Figure 5:
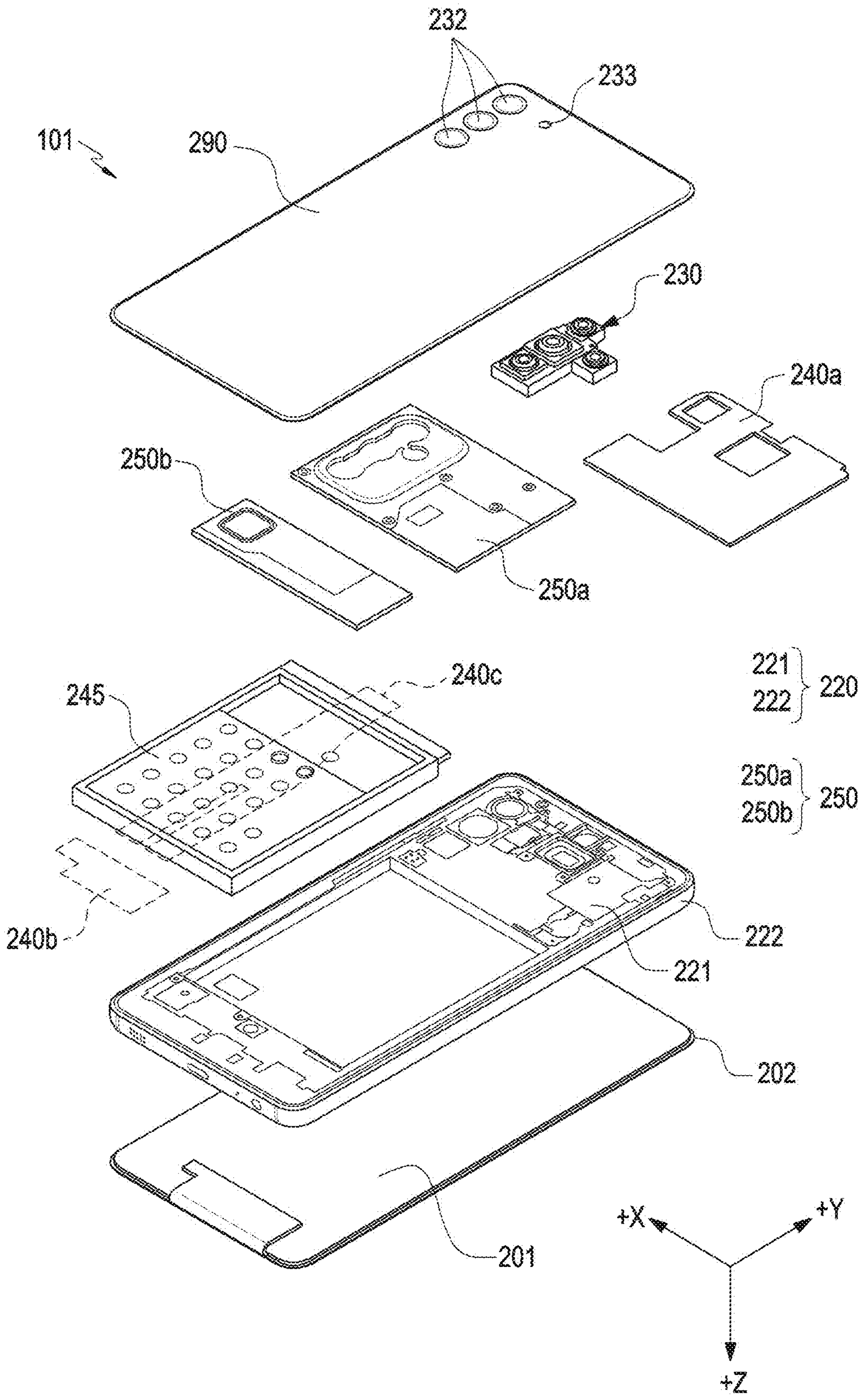
FIG. 5 is a rear exploded perspective view illustrating an electronic device according to an embodiment of the disclosure.

FIG. 4 is a front exploded perspective view illustrating an electronic device according to an embodiment of the disclosure. FIG. 5 is a rear exploded perspective view illustrating an electronic device according to an embodiment of the disclosure.

Referring to FIGS. 4 and 5, an electronic device 101 (e.g., the electronic device 101 of FIG. 1 and/or the electronic device 101 of FIG. 2 or 3) includes a display 201 (e.g., the display 201 of FIG. 2), a front plate 202 (e.g., the front plate 202 of FIG. 2), a supporting structure 221 (e.g., a bracket), a side bezel structure (or a side bezel structure) 222, a camera module 230 (e.g., the camera module 180 of FIG. 1), at least one printed circuit board (or board assembly) 240_a_ and 240_b_, a battery 245 (e.g., the battery 189 of FIG. 1), a rear case 250, an antenna (not illustrated) (e.g., the antenna module 197 of FIG. 1), and/or a rear plate 290 (e.g., the rear plate 211 of FIG. 3). According to an embodiment, when the plurality of printed circuit boards 240_a_ and 240_b_ are included, the electronic device 101 may include at least one flexible printed circuit board 240_c_ to electrically connect different printed circuit boards. For example, the printed circuit boards 240_a_ and 240_b_ includes a first circuit board 240_a_ disposed above (e.g., in the +Y-axis direction) the battery 245 and a second circuit board 240_b_ disposed below (e.g., in the −Y-axis direction), and flexible printed circuit board 240_c_ may electrically connect the first circuit board 240_a_ and the second circuit board 240_b_.

According to an embodiment, the electronic device 101 may omit at least one (e.g., the supporting structure 221, the rear case 250, or the flexible printed circuit board 240_c_) of the components or may further include other components. At least one of the components of the electronic device 101 may be the same or similar to at least one of the components of the electronic device 101 of FIG. 2 or 3 and no duplicate description is made below.

In an embodiment, at least a portion of the supporting structure 221 may be provided in a flat plate shape. In an embodiment, the supporting structure 221 may be disposed inside the electronic device 101 to be connected to the side bezel structure 222 or may be integrally formed with the side bezel structure 222. For example, the supporting structure 221 is formed of a conductive material and/or a non-conductive material (e.g., polymer). When the supporting structure 221 at least partially includes a conductive material such as metal, a portion of the side bezel structure 222 or the supporting structure 221 may function as an antenna. The supporting structure 221 may include two surfaces facing in directions opposite to each other. The display 201 may be disposed on one of the two surfaces of the supporting structure 221, and the printed circuit boards 240_a_ and 240_b_ may be disposed on the other surface.

According to an embodiment, the supporting structure 221 and the side bezel structure 222 may be collectively referred to as a front case or a housing 220. According to an embodiment, the housing 220 may be generally understood as a structure for receiving, protecting, or disposing electrical/electronic components such as the printed circuit boards 240_a_ and 240_b_ or the battery 245. In an embodiment, it may be understood that the housing 220 includes a structure visually or tactilely recognizable by the user on the exterior of the electronic device 101, e.g., the side bezel structure 222, the front plate 202, and/or the rear plate 290. In an embodiment, the front surface or the rear surface of the housing 220 may refer to the first surface 210A of FIG. 2 or the second surface 210B of FIG. 3. In an embodiment, the supporting structure 221 may be disposed between the front plate 202 (e.g., the first surface 210A of FIG. 2) and the rear plate 290 (e.g., the second surface 210B of FIG. 3), and may function as a structure for disposing electrical/electronic components such as the printed circuit board 240_a_ or 240_b_ or the camera module 230. In the following detailed description, it may be exemplified that the camera module 230 of the electronic device 101 generally includes a configuration for receiving incident light through the second surface 210B of the electronic device 101, but the electronic device 101 may further include a camera module (e.g., the camera module 205 of FIG. 2) and/or a sensor module (e.g., the sensor module 204 of FIG. 2) disposed to be exposed to the outside through at least a portion of the display 201.

According to an embodiment, the camera module 230 may include at least one camera module, e.g., at least one of the plurality of camera modules illustrated in FIGS. 4 and 5. In an embodiment, the camera module 230 may be disposed on a portion of the supporting structure 221 at a position adjacent to the printed circuit boards 240_a_ and 240_b_. In an embodiment, the camera module 230 may be at least partially surrounded by the rear case 250 (e.g., the upper rear case 250_a_). According to an embodiment, the camera module 230 may receive at least part of the incident light through the optical hole inside the electronic device 101 or the cover window(s) 232 and 233 disposed on the rear surface (e.g., the second surface 210B of FIG. 3) of the electronic device 101. According to an embodiment, the camera module 230 may be generally aligned with any one of the cover window(s) 232 and 233.

According to an embodiment, a circuit device (e.g., a processor), a communication module (e.g., the communication module 190 of FIG. 1), a power management module (e.g., the power management module 188), memory (e.g., the memory 130 of FIG. 1), an interface (e.g., the interface 177 of FIG. 1), or various electrical/electronic components implemented in the form of an integrated circuit chip may be disposed on the printed circuit board 240*a* or 240*b*. The processor (e.g., the processor 120 of FIG. 1) may include one or more of a central processing unit, an application processor, a graphic processing device, an image signal processing, a sensor hub processor, or a communication processor. The memory may include, e.g., a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector. According to an embodiment, the printed circuit boards 240*a* and 240*b* may be provided with an electromagnetic shielding environment from the rear case 250.

According to an embodiment, the battery 245 may be a device for supplying power to at least one component of the electronic device 101. The battery 189 may include, e.g., a primary cell which is not rechargeable, a secondary cell which is rechargeable, or a fuel cell. At least a portion of the battery 245 may be disposed on substantially the same plane as the printed circuit board 240*a* and 240*b*. The battery 245 may be integrally or detachably disposed inside the electronic device 101.

According to an embodiment, the rear case 250 may include an upper rear case 250*a* and a lower rear case 250*b*. In an embodiment, the upper rear case 250*a* may be disposed to surround the printed circuit boards 240*a* and 240*b* (e.g., the first circuit board 240*a*), together with a portion of the supporting structure 221. For example, the upper rear case 250*a* is disposed to face the supporting structure 221 with the first circuit board 240*a* interposed therebetween.

In an embodiment, the lower rear case 250*b* may be utilized as a structure in which electrical/electronic components, such as an interface (e.g., a USB connector, an SD card/MMC connector, or an audio connector) may be disposed. According to an embodiment, electrical/electronic components, such as an interface (e.g., a USB connector, an SD card/MMC connector, or an audio connector) may be disposed on an additional printed circuit board (not illustrated). In this case, the lower rear case 250*b*, together with the other part of the supporting structure 221, may be disposed to surround the additional printed circuit board (not illustrated). For example, an interface disposed in an additional printed circuit board not illustrated or the lower rear case 250*b* is disposed corresponding to the sound hole 207 or the connector holes 208 and 209 of FIG. 2.

According to an embodiment, the antenna (not illustrated) may include, e.g., a conductor pattern implemented on the surface of the rear case 250 through a laser direct structuring method. In an embodiment, the antenna may include a printed circuit pattern formed on the surface of the thin film. The thin film-type antenna may be disposed between the rear plate 290 and the battery 245. The antenna may include, e.g., a near-field communication (NFC) antenna, a wireless charging antenna, and/or a magnetic secure transmission (MST) antenna. The antenna may perform short-range communication with, e.g., an external device or may wirelessly transmit or receive power necessary for charging. In an embodiment, another antenna structure may be formed by a part or a combination of the supporting structure 221 and/or the side bezel structure 222.

Figure 6:
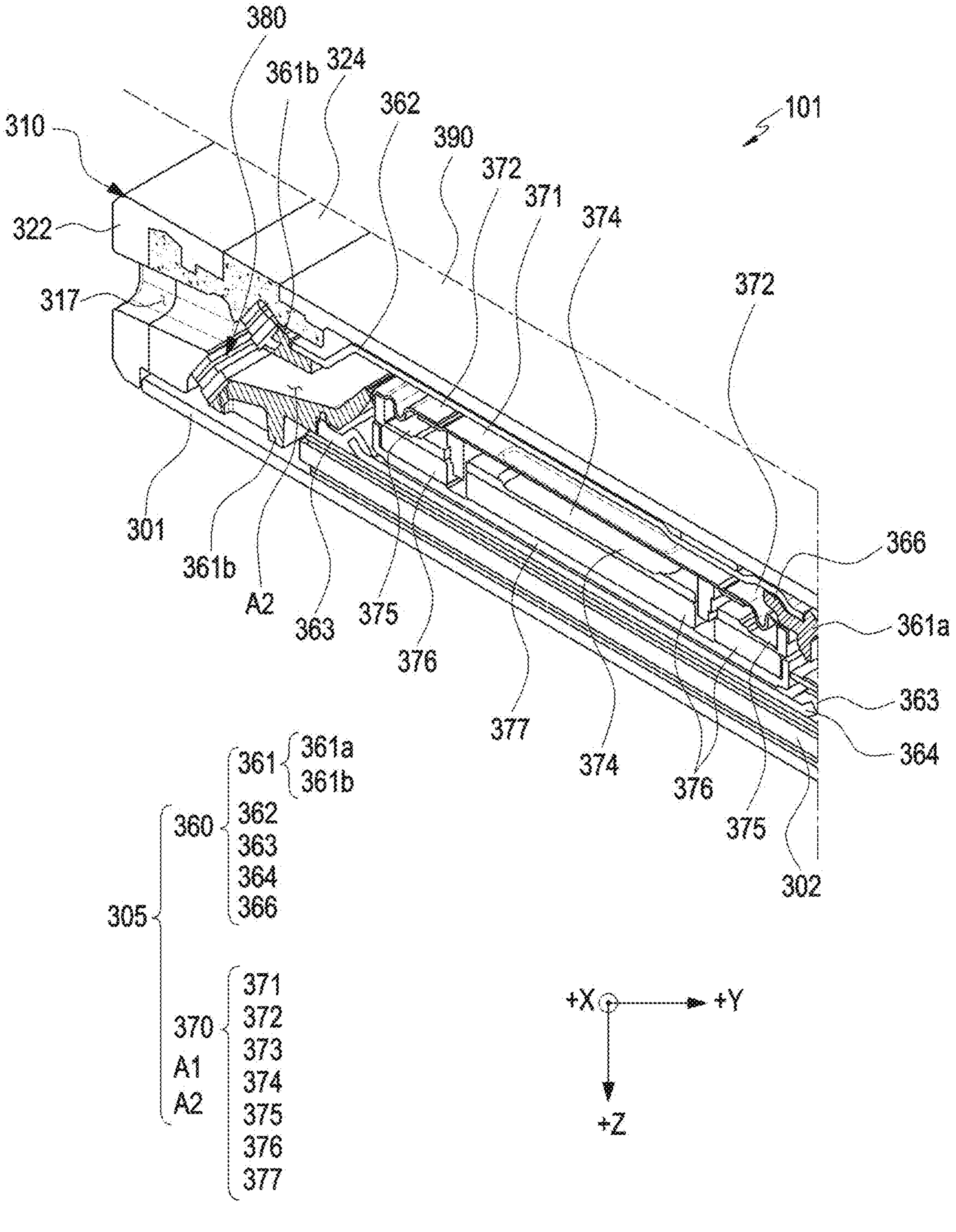
FIG. 6 is a cross-sectional perspective view illustrating a speaker assembly according to an embodiment of the disclosure.
Figure 7A:
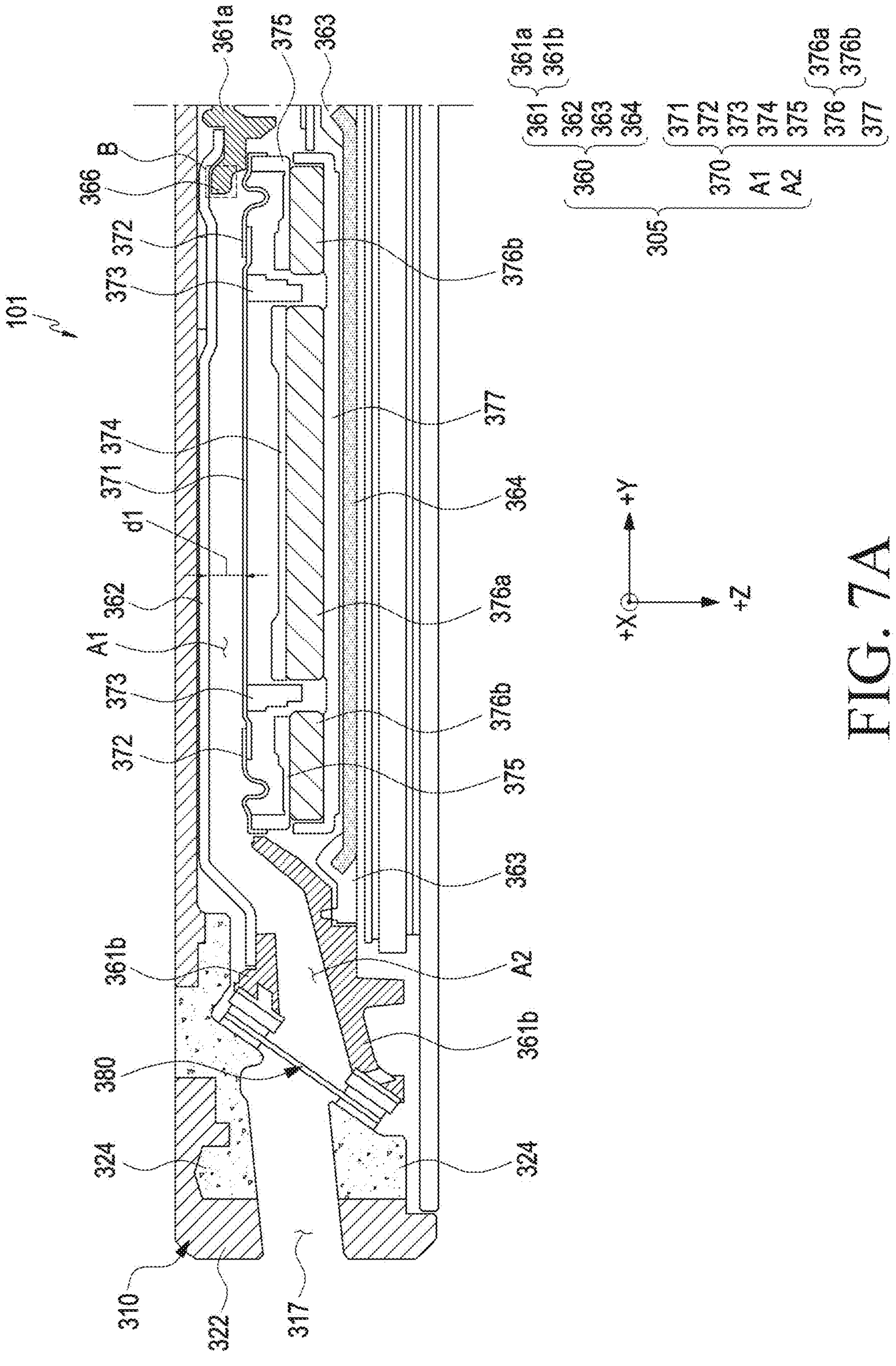
FIG. 7A is a side cross-sectional view illustrating an electronic device for describing a speaker assembly according to an embodiment of the disclosure.
Figure 7B:
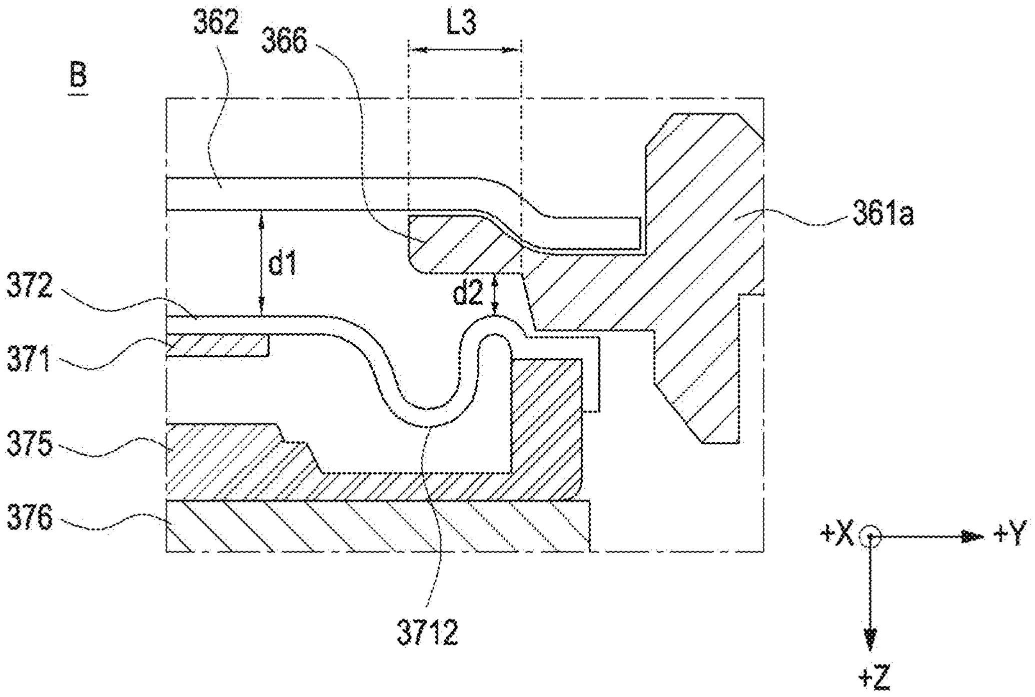
FIG. 7B is an enlarged view illustrating portion B of FIG. 7A according to an embodiment of the disclosure.
Figure 8A:
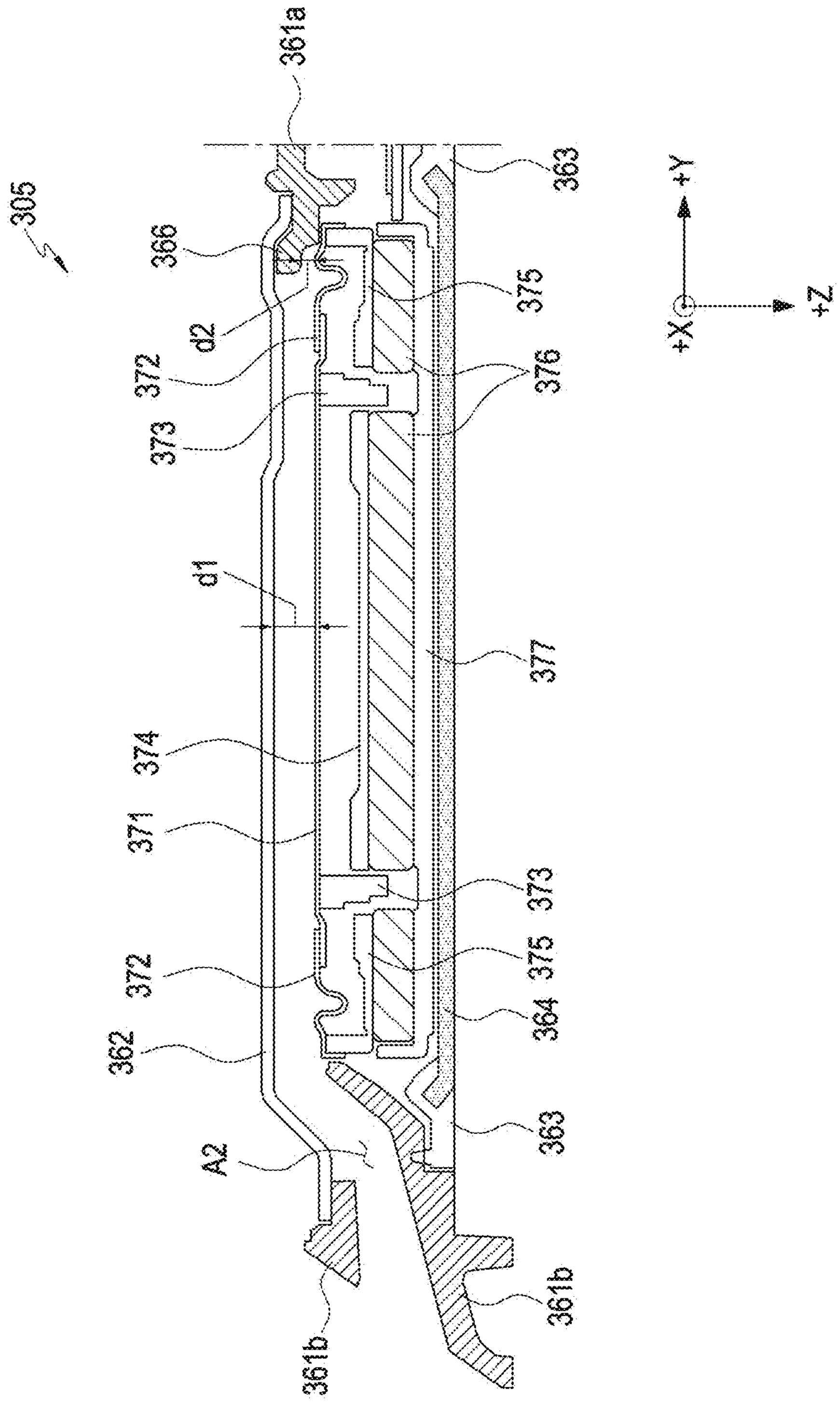
FIG. 8A is a side cross-sectional view illustrating a state of a speaker assembly of an electronic device before operation, according to an embodiment of the disclosure.
Figure 8B:
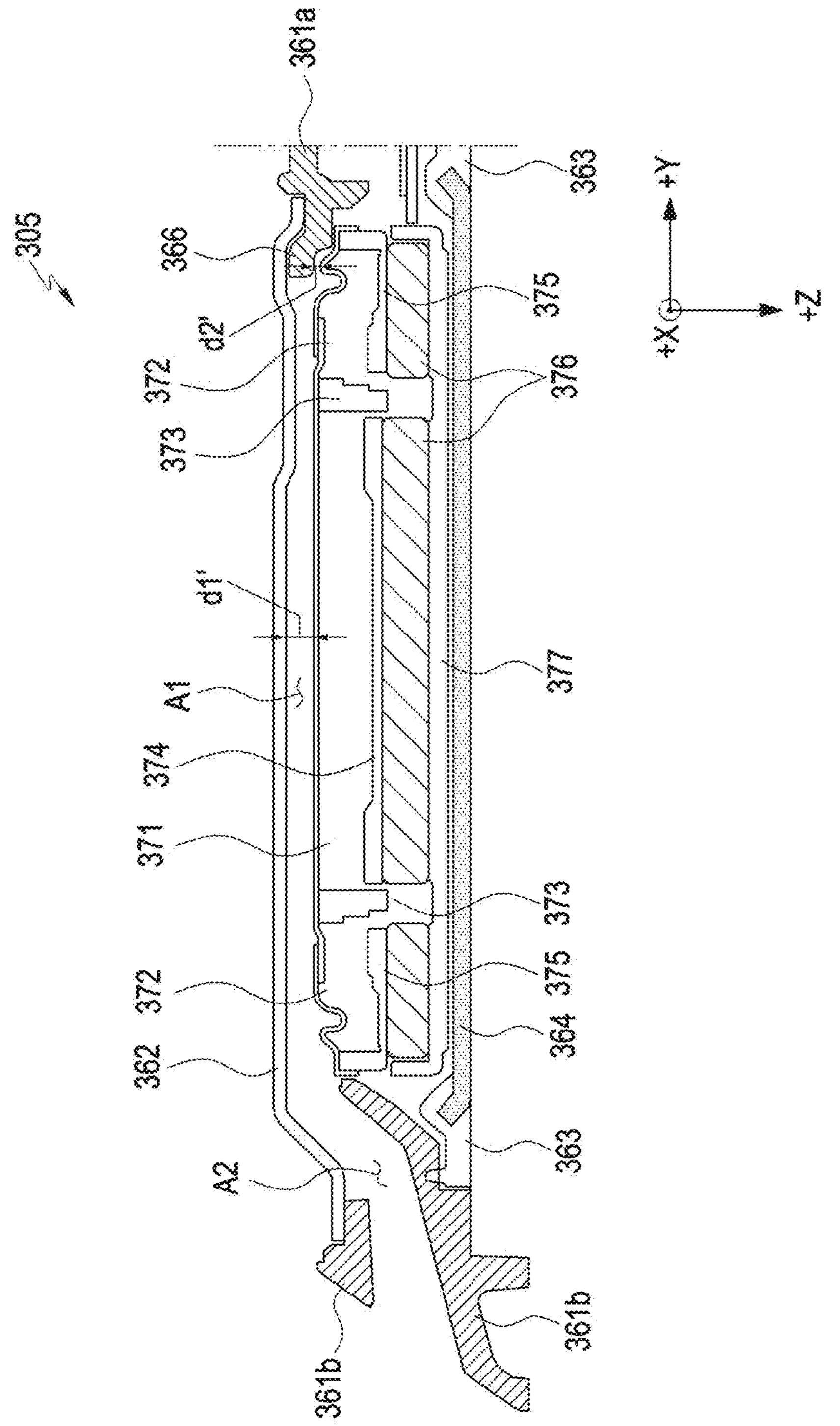
FIG. 8B is a side cross-sectional view illustrating a state of a speaker assembly of an electronic device during operation, according to an embodiment of the disclosure.

FIG. 6 is a cross-sectional perspective view illustrating a speaker assembly according to an embodiment of the disclosure. FIG. 7A is a side cross-sectional view illustrating an electronic device for describing a speaker assembly according to an embodiment of the disclosure. FIG. 7B is an enlarged view illustrating portion B of FIG. 7A according to an embodiment of the disclosure. FIG. 8A is a side cross-sectional view illustrating a state of a speaker assembly of an electronic device before operation, according to an embodiment of the disclosure. FIG. 8B is a side cross-sectional view illustrating a state of a speaker assembly of an electronic device during operation, according to an embodiment of the disclosure.

The configuration of the electronic device 101 of FIGS. 6 and 7A may be identical in whole or part to the configuration of the electronic device 101 of FIGS. 1 to 5. In the disclosure, it may be understood that "A and B face each other" includes not only a structure in which A and B face each other directly but also an example in which another component is disposed between A and B.

Referring to FIGS. 6 and 7A, in an embodiment, an electronic device 101 may include a display 301 (e.g., the display 201 of FIGS. 2 to 5), a front plate 302 (e.g., the front plate 202 of FIGS. 2 to 5), a housing 310 (e.g., the housing 210 of FIGS. 2 to 5), a rear plate 390 (e.g., the rear plate 211 of FIGS. 2 and 3 and the rear plate 290 of FIGS. 4 and 5), and a speaker assembly 305. According to an embodiment, the housing 310 may include a side frame 322 (e.g., the side frame 222 of FIGS. 4 and 5) and a rear injection-molded structure 324 that form a portion of the exterior of the electronic device 101.

According to an embodiment, the electronic device 101 may include a speaker hole 317 formed in the side frame 322. According to an embodiment, the speaker hole 317 may be an external speaker hole (e.g., the external speaker hole 207 of FIGS. 2 and 3) formed through a portion of the side frame 322. In the disclosure, the position of the speaker hole 317 may be changed. In an embodiment, the speaker hole 317 may be formed in the front surface (e.g., the first surface 210A of FIG. 2) of the electronic device 101, and for example, the speaker hole 317 is a speaker hole (e.g., the call receiver hole 214 of FIG. 2) disposed adjacent to the edge of the display 320. According to an embodiment, the speaker assembly 305 may be connected or fluidly connected to the speaker hole 317. The speaker assembly 305 may be configured to radiate sound (or vibration) to the outside of the electronic device 101 through the speaker hole 317.

Referring to FIGS. 6, 7A, 7B, 8A, and 8B, according to an embodiment, the speaker assembly 305 may include a speaker housing 360 and a speaker 370 (e.g., the audio module 170 of FIG. 1) disposed in the speaker housing 360. According to an embodiment, the speaker assembly 305 may include a sound space A1, which is a space in which sound is primarily radiated from the speaker 370 (e.g., the diaphragm 371). According to an embodiment, the speaker assembly 305 may include a passage (or sound passage) A2 connecting the sound space (or duct) A1 and the first speaker hole 317. For example, the sound output from the speaker 370 is radiated to the outside of the electronic device 101 through the sound space A1 and the passage A2 and then the first speaker hole 317. In an embodiment, the speaker assembly 305 may omit at least one of the components or may further include other components.

Referring to FIGS. 6, 7A, 7B, 8A, and 8B, according to an embodiment, the speaker housing 360 may include a first supporting structure (or speaker case) 361, a first speaker cover (or cover plate) 362, a second supporting structure 363, a second speaker cover 364, and at least one step structure 366. As is described below, the step structure 366 according to an embodiment of the disclosure may adjust the frequency of the sound output from the speaker 370 and reflected by the step structure 366, thereby enhancing the high-frequency band performance or sound quality of the speaker assembly 305. Referring to FIGS. 6, 7A, 7B, 8A, and 8B, according to an embodiment, the speaker 370 may include a diaphragm 371, a coil (or a voice coil 373), a suspension 372, a plate 374, a frame 375, a magnetic member 376, and/or a yoke 377.

According to an embodiment, the first supporting structure 361 may include a first portion 361*a* and a second portion 361*b*. According to an embodiment, the first portion 361*a* of the first supporting structure 361 may form a sidewall structure disposed around the speaker 370. For example, the first portion 361*a* surrounds at least a portion of the speaker 370. According to an embodiment, the first portion 361*a* may be formed to surround at least a portion of the sound space A1 between the first speaker cover 362 and the speaker 370 (e.g., the diaphragm 371). According to an embodiment, the first portion 361*a* may be formed to provide an open space (or an opening) to one side of the sound space A1 to pass through the passage A2. For example, the open space is positioned on one side of the sound space A1 toward the first speaker hole 317 (e.g., the −Y direction).

According to an embodiment, the second portion 361*b* of the first supporting structure 361 may extend from a portion of the first portion 361*a* toward the first speaker hole 317. For example, the second portion 361*b* is positioned substantially between the first speaker hole 317 and the first portion 361*a*. According to an embodiment, a passage A2 connecting the first speaker hole 317 and the sound space A1 between the first speaker cover 362 and the speaker 370 (e.g., the diaphragm 371) may be formed inside the second portion 361*b*. In the disclosure, the first portion 361*a* and the second portion 361*b* are distinguished from each other solely for description purposes, but may be integrally formed with each other. For example, the first portion 361*a* is a portion of the first supporting structure 361, and the second portion 361*b* is a remaining portion of the first supporting structure 361.

According to an embodiment, the first speaker cover 362 may be disposed to be spaced apart from the speaker 370 (e.g., the diaphragm 371). According to an embodiment, at least a portion of the first speaker cover 362 may face the speaker 370 (e.g., the diaphragm 371). For example, the first speaker cover 362 and the diaphragm 371 of the speaker 370 are spaced apart from each other by a first distance d1. For example, the first distance d1 means an average distance between the first speaker cover 362 and the diaphragm 371 when the speaker 370 is not operated.

According to an embodiment, the second supporting structure 363 may be connected to a portion (the first portion 361*a* and/or the second portion 361*b*) of the first supporting structure 361 and the second speaker cover 364. For example, the second supporting structure 363 is disposed around the second speaker cover 364. For example, the second supporting structure 363 is connected to or integrally formed with at least a portion of an edge of the yoke 377. According to an embodiment, the second speaker cover 364 may face the first speaker cover 362 with the speaker 370 interposed therebetween. For example, one surface (e.g., the surface in the +Z direction) of the second speaker cover 364 faces a portion (e.g., the yoke 377) of the speaker 370. For example, the speaker housing 360 is formed of various materials. For example, the first supporting structure 361 and/or the first speaker cover 362 include rubber, a synthetic resin, and/or metal.

In an embodiment, the step structure 366 may be disposed adjacent to a corner where a portion of the first portion 361*a* of the first supporting structure 361 contacts the first speaker cover 362. According to an embodiment, the step structure 366 may reflect a portion of the sound output from the speaker 370 toward the first speaker hole 317. For example, the frequency of the sound reflected from the step structure 366 is different from the frequency of the sound reflected from the first portion 361*a* in which the step structure 366 is disposed. For example, the band of the frequency of the sound reflected from the first portion 361*a* in which the step structure 366 is disposed higher than the band of the frequency of the sound reflected from the step structure 366.

In an embodiment, the step structure 366 may be disposed to be spaced apart from the speaker 370 (e.g., the diaphragm 371 and the suspension 372). For example, referring to FIG. 7B, the step structure 366 is spaced apart from the suspension 372 of the speaker 370 by a second distance d2. For example, the second distance d2 means an average distance between the first speaker cover 362 and the speaker 370 when the speaker 370 is not operated. According to an embodiment, the step structure 366 may be spaced apart from the diaphragm 371 and the suspension 372 to contact the diaphragm 371 or the suspension 372 when the speaker 370 operates.

According to an embodiment, the step structure 366 may protrude from the surface of the first supporting structure 361 by a designated distance (e.g., L3 of FIG. 7B). According to an embodiment, the step structure 366 may not overlap the diaphragm 371 but may overlap at least a portion of the suspension 372 when the first speaker cover 362 is viewed from above (or viewed in the +Z direction). According to an embodiment, the step structure 366 may include two surfaces (e.g., a surface in the +Z direction and a surface in the −Y direction) forming a non-zero angle (e.g., 90 degrees) therebetween. In the disclosure, the shape of the step structure 366 may be changed, and for example, the step structure 366 includes three or more continuous surfaces, may include a curved surface as a whole, or may have an irregular shape.

According to an embodiment, the step structure 366 may be a portion of the first supporting structure 361. For example, the step structure 366 is integrally formed with the first supporting structure 361, and is formed or manufactured by, e.g., injection molding. In an embodiment, the material of the step structure 366 may be similar to or substantially the same as the material of the first supporting structure 361. For example, the step structure 366 is formed of various materials such as rubber, synthetic resin, or metal.

According to an embodiment, the speaker assembly 305 may further include a cap member 380 disposed to block an end portion of the passage A2 of the second portion 361*b* of the first supporting structure 361. For example, the cap member 380 is formed to prevent foreign substances such as moisture outside the electronic device 101 from entering the speaker housing 360 through the first speaker hole 317. For example, the cap member 380 includes a porous structure such as a mesh. For example, the cap member 380 may be configured to connect the second portion 361*b* of the first supporting structure 361 to a portion (e.g., the rear injection-molded structure 324) of the housing 310. For example, the cap member 380 provides a waterproof structure to a connection portion between the second portion 361*b* of the first supporting structure 361 and a portion (e.g., the rear injection-molded structure 324) of the housing 310.

Referring to FIGS. 6, 7A, 7B, 8A, and 8B, according to an embodiment, the speaker 370 may include a diaphragm 371, a coil (or a voice coil 373), a suspension 372, a plate 374, a frame 375, a magnetic member 376, and/or a yoke 377.

According to an embodiment, the diaphragm 371 may linearly reciprocate in a direction (Z-axis direction) toward or away from the yoke 377 or the first speaker cover 362 based on the electromagnetic force formed by the coil 373 and the magnetic member 376 and/or the elastic force of the suspension 372. For example, the diaphragm 371 has a flat plate shape. In the disclosure, the shape of the diaphragm 371 may be changed. For example, the diaphragm 371 is at least partially bent, and may include, e.g., a recessed area (e.g., the recess 3711 of FIG. 15A).

According to an embodiment, the coil 373 may be disposed between the diaphragm 371 and the yoke 377. For example, the coil 373 contacts, is adjacent to, and/or connected to one surface (e.g., a surface in the +Z direction) of the diaphragm 371. The coil 373 may be disposed in a magnetic field formed by the magnetic member 376. For example, the coil 373 generates an electric field by receiving an electric signal from a processor (e.g., the processor 120 of FIG. 1). For example, the coil 373 is moved relative to the magnetic member 376 by the interaction between the magnetic field and the electric field. For example, the coil 373 linearly reciprocates in a direction (Z-axis direction) toward or away from the yoke 377 or the first speaker cover 362. For example, the coil 373 linearly reciprocates the diaphragm 371 contacting or connected to the coil 373 while linearly reciprocating.

According to an embodiment, the speaker 370 further includes a suspension 372 (or an edge or a surrounder). According to an embodiment, the suspension 372 may connect the diaphragm 371 to the magnetic member 376 or the frame 375. According to an embodiment, the suspension 372 may be disposed around the diaphragm 371, and for example, is disposed to surround at least a portion of an edge of the diaphragm 371. For example, the diaphragm 371 is referred to as a high-frequency band dome of the diaphragm, and the suspension 372 may be referred to as a low-frequency band dome of the diaphragm. For example, the suspension 372 is connected to or integrally formed with the diaphragm 371.

According to an embodiment, the elastic force of the suspension 372 may support the vibration plate 371 that linearly reciprocates. For example, when the speaker 370 operates to linearly reciprocate the diaphragm 371, the suspension 372 provides an elastic force for moving the diaphragm 371 to an initial position of the diaphragm 371 before the speaker 370 operates. According to an embodiment, the suspension 372, together with the diaphragm 371, may linearly reciprocate in a direction (Z-axis direction) toward or away from the yoke 377 or the first speaker cover 362. For example, the distance or range in which the suspension 372 linearly reciprocates is smaller than the distance or range in which the diaphragm 371 linearly reciprocates. For example, the suspension 372 includes a bent portion (e.g., the bent portion 3712 of FIG. 7B) that is bent or protrudes in a direction opposite to the position of the diaphragm 371 or toward the magnetic member 376 or the yoke 377. For example, the bending portion 3712 has a structure that reinforces the elastic force of the suspension 372. For example, the suspension 372 includes a metal or synthetic resin.

In an embodiment, the suspension 372 may be directly connected to the diaphragm 371, but the frame 375 may not be directly connected to the magnetic member 376 or the yoke 377. In an embodiment, the frame 375 may be coupled to an edge of the suspension 372 and may be mounted on any one of other structures, e.g., the yoke 377 or the magnetic member 376. For example, the frame 375 and/or the suspension 372 supports the diaphragm 371 to linearly reciprocate.

According to an embodiment, the magnetic member 376 may be a permanent magnet and may be disposed between the diaphragm 371 and the yoke 377. For example, the magnetic member 376 acts with the electric force of the coil 373 to provide a magnetic force for linearly reciprocating the coil 373. According to an embodiment, the magnetic member 376 may include a first magnetic member 376*a* surrounded by the coil 373 and a second magnetic member 376*b* disposed around the coil 373. For example, the second magnetic member 376*b* is disposed to be spaced apart from the first magnetic member 376*a* with the coil 373 interposed therebetween. The shape, number, and/or arrangement of the magnetic members 376 may be changed according to specifications required by the speaker assembly 305 to be actually manufactured and/or the electronic device 101 including the speaker assembly 305.

According to an embodiment, the plate 374 may be disposed between the diaphragm 371 and the first magnetic member 376*a*. According to an embodiment, the plate 374 may be disposed on one surface (e.g., a surface in the −Z direction) of the first magnetic member 376*a*. According to an embodiment, the frame 375 may be disposed between the diaphragm 371 and the second magnetic member 376*b*. According to an embodiment, the frame 375 may be disposed on one surface (e.g., a surface in the −Z direction) of the second magnetic member 376*b*, and a portion of the frame 375 may be connected to the suspension 372. For example, the plate 374 and/or the frame 375 aligns the direction or distribution of the magnetic field generated by the magnetic member 376.

According to an embodiment, the yoke 377 may be disposed to face the diaphragm 371 and the suspension 372 with other components (e.g., the coil 373, the plate 374, the frame 375, and/or the magnetic member 376) of the speaker 370 interposed therebetween. For example, the yoke 377 supports linear reciprocation of the coil 373, the diaphragm 371, and/or the suspension 372. For example, the yoke 377 aligns the direction or distribution of the magnetic field generated by the magnetic member 376. For example, the yoke 377 serves to concentrate, together with the plate 374 and/or the frame 375, the magnetic field generated by the magnetic member 376 onto an internal component (e.g., the coil 373) of the speaker 370.

FIGS. 8A and 8B are views comparing and illustrating the positions of the diaphragm 371 and the suspension 372 before and during operation of the speaker assembly 305.

According to an embodiment, as described above, when the speaker assembly 305 operates, the diaphragm 371 may linearly reciprocate in a direction (Z-axis direction) toward or away from the yoke 377 or the first speaker cover 362 based on the electromagnetic force formed by the coil 373 and the magnetic member 376 and/or the elastic force of the suspension 372. According to an embodiment, the suspension 372, together with the diaphragm 371, may linearly reciprocate in a direction (Z-axis direction) toward or away from the yoke 377 or the first speaker cover 362. For example, the distance or range in which the suspension 372 linearly reciprocates is smaller than the distance or range in which the diaphragm 371 linearly reciprocates.

Referring to FIG. 8A, before the speaker assembly 305 operates, the distance between the first speaker cover 362 and the diaphragm 371 may be a first distance d1 (e.g., the first distance d1 of FIGS. 6, 7A, and 7B), and the distance between the step structure 366 and the suspension 372 may be a second distance d2 (e.g., the second distance d2 of FIGS. 6, 7A, and 7B). For example, the first distance d1 ranges from about 0.45 mm to about 0.65 mm, or ranges from about 0.5 mm to about 0.6 mm, and may be, e.g., about 0.55 mm.

FIG. 8B may illustrate a state in which, e.g., when the speaker assembly 305 operates, the diaphragm 371 and the suspension 372 are disposed closest to the first speaker cover 362 or the step structure 366. Referring to FIG. 8B, the 1-2th distance d12 may be a minimum value of the distance between the first speaker cover 362 and the diaphragm 371 when the speaker assembly 305 operates. According to an embodiment, the step structure 366 may be spaced apart from the diaphragm 371 and the suspension 372 to contact the diaphragm 371 or the suspension 372 when the speaker 370 operates. For example, the 2-2th distance d22 is a minimum value of the distance between the step structure 366 and the suspension 372 when the speaker assembly 305 operates. According to an embodiment, the 2-2th distance d22 may be less than the 1-2th distance d12. For example, the ratio of the 1-2th distance d12 to the 2-2th distance d22 is about 3:2. For example, the 1-2th distance d12 ranges from about 0.05 mm to about 0.25 mm, or ranges from about 0.1 mm to about 0.2 mm, and may be, e.g., about 0.15 mm. For example, the 2-2th distance d22 ranges from about 0.01 mm to about 0.2 mm, or ranges from about 0.5 mm to about 0.15 mm, and may be, e.g., about 0.1 mm. The state of the speaker assembly 305 illustrated in FIG. 8B is exemplary, and the relative positions of the diaphragm 371 and the suspension 372 with respect to the yoke 377 or the speaker housing 360 may be changed.

Figure 9:
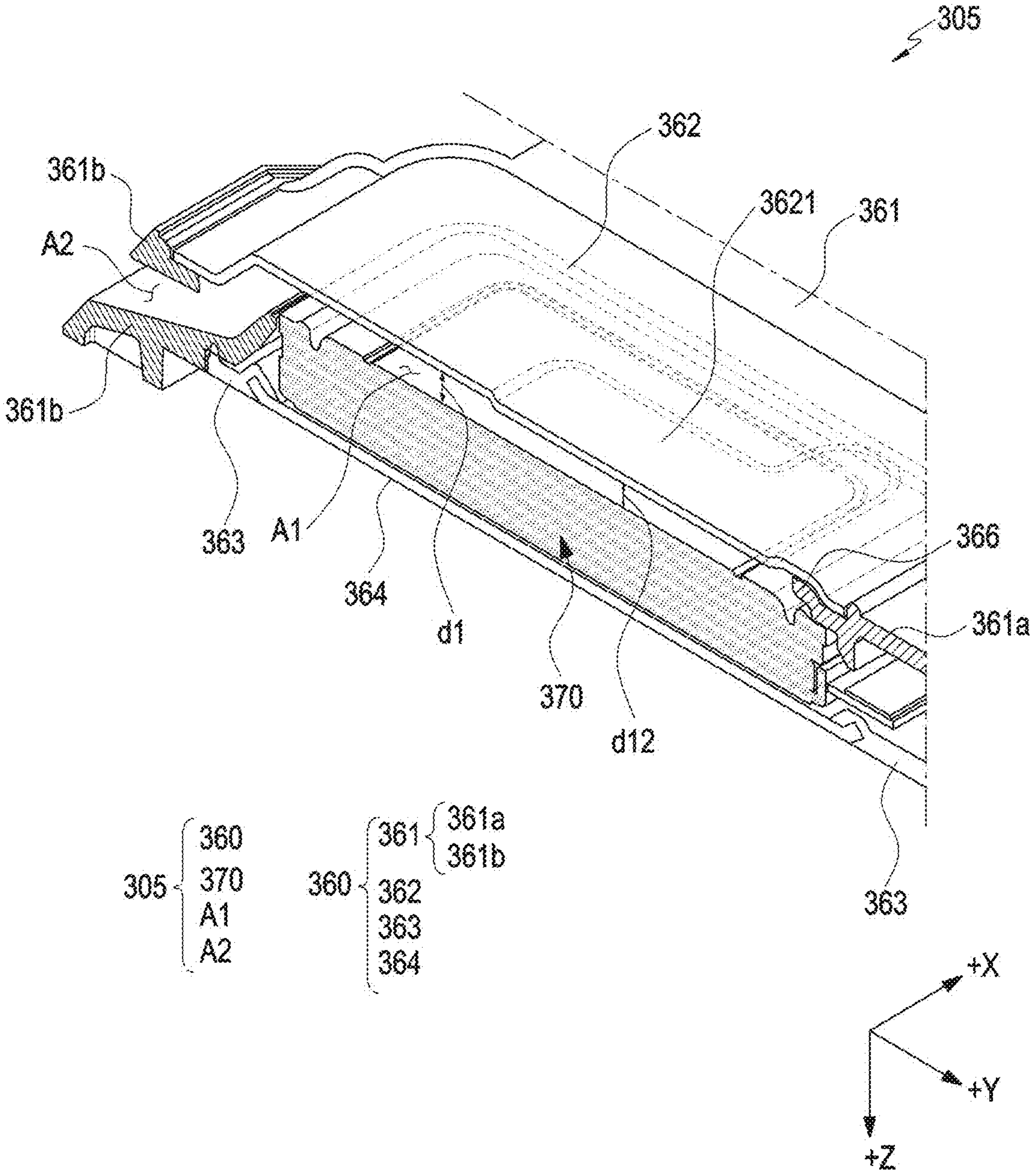
FIG. 9 is a cross-sectional perspective view illustrating a speaker assembly according to an embodiment of the disclosure.
Figure 10:
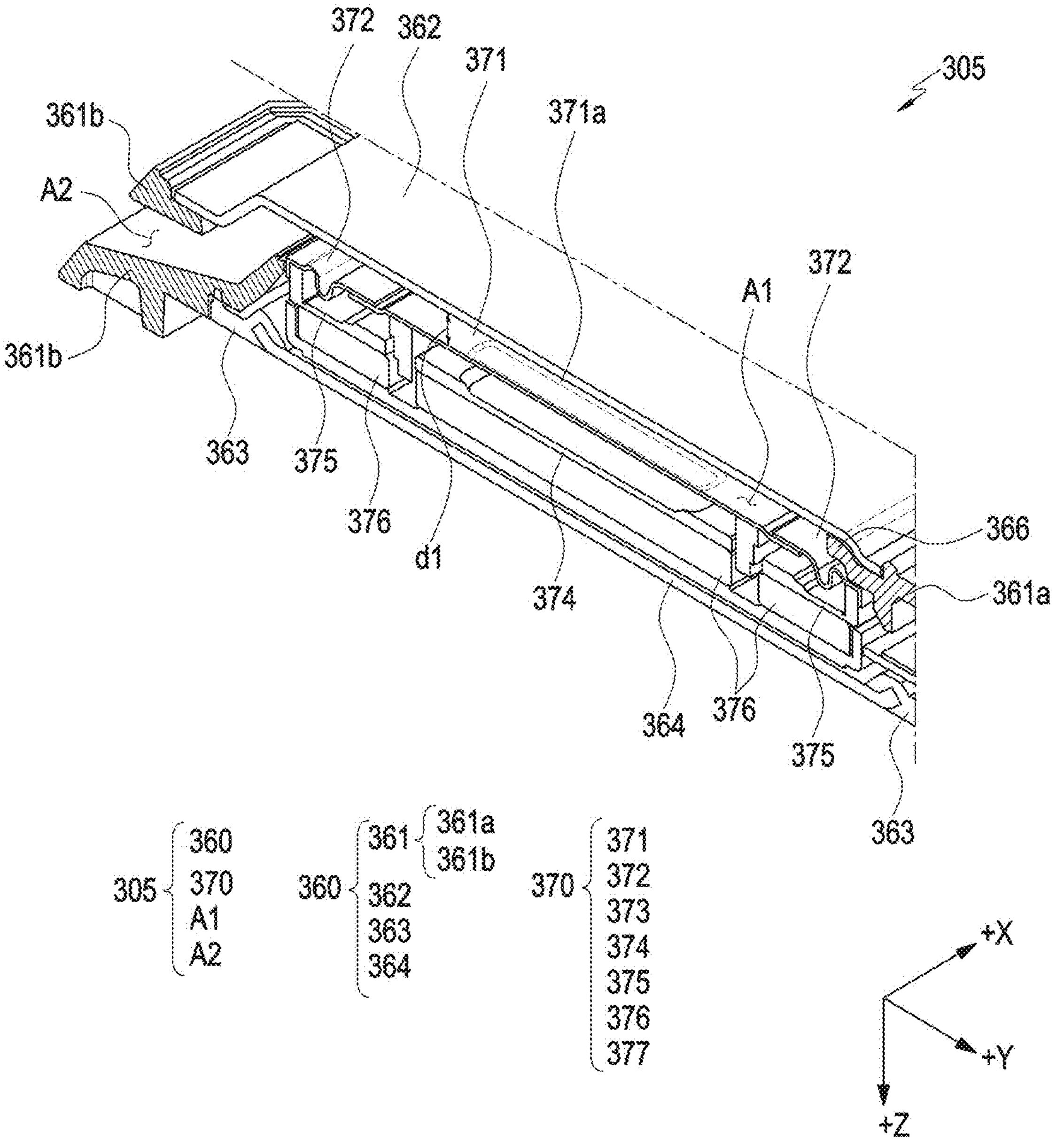
FIG. 10 is a cross-sectional perspective view illustrating a speaker assembly according to an embodiment of the disclosure.

FIG. 9 is a cross-sectional perspective view illustrating a speaker assembly according to an embodiment of the disclosure. FIG. 10 is a cross-sectional perspective view illustrating a speaker assembly according to an embodiment of the disclosure.

The speaker assembly 305 of FIGS. 9 and 10 may be referred to as the speaker assembly 305 of FIGS. 6, 7A, 8A, and 8B.

Referring to FIG. 9, in an embodiment, the first speaker cover 362 may include a first recess 3621 recessed in a partial area toward the speaker 370 (e.g., the speaker 370 of FIGS. 6 and 7A). For example, the edge of the first recess 3621 is in the form of a closed curve. For example, another component of the electronic device (e.g., the electronic device 101 of FIGS. 1 to 6, and 7A) may be disposed on the outer surface of the first recess 3621. For example, an intermediate member having elasticity and/or adhesion is disposed on the outer surface of the first recess 3621, and thus an electrical/electronic component or a conductive component may be disposed.

Referring to FIG. 9, in an embodiment, the distance between the first speaker cover 362 and the speaker 370 may include a first distance d1 (e.g., the first distance d1 of FIGS. 6, 7A, and 10), which is an distance between an area around the first recess 3621 of the first speaker cover 362 and a diaphragm (e.g., the diaphragm 371 of FIGS. 6, 7A, 7B, 8A, 8B, and 9 to 11) of the speaker 370, and a 1-1 distance d12, which is an distance between the first recess 3621 and the diaphragm 371.

Referring to FIG. 10, the first speaker cover 362 may not include a recessed area such as the first recess 3621 of FIG. 9. Referring to FIG. 10, the diaphragm 371 may include a second recess 3711 (e.g., 3711 of FIG. 15A) in which a partial area of the central portion is recessed toward the yoke 377. According to the embodiment of FIG. 10, a first distance d1 (e.g., the first distance d1 of FIGS. 6, 7A, and 10), which is a distance between the first speaker cover 362 and the diaphragm 371, may be a distance between the first speaker cover 362 and an area around the second recess 3711 of the diaphragm 371.

Figure 11:
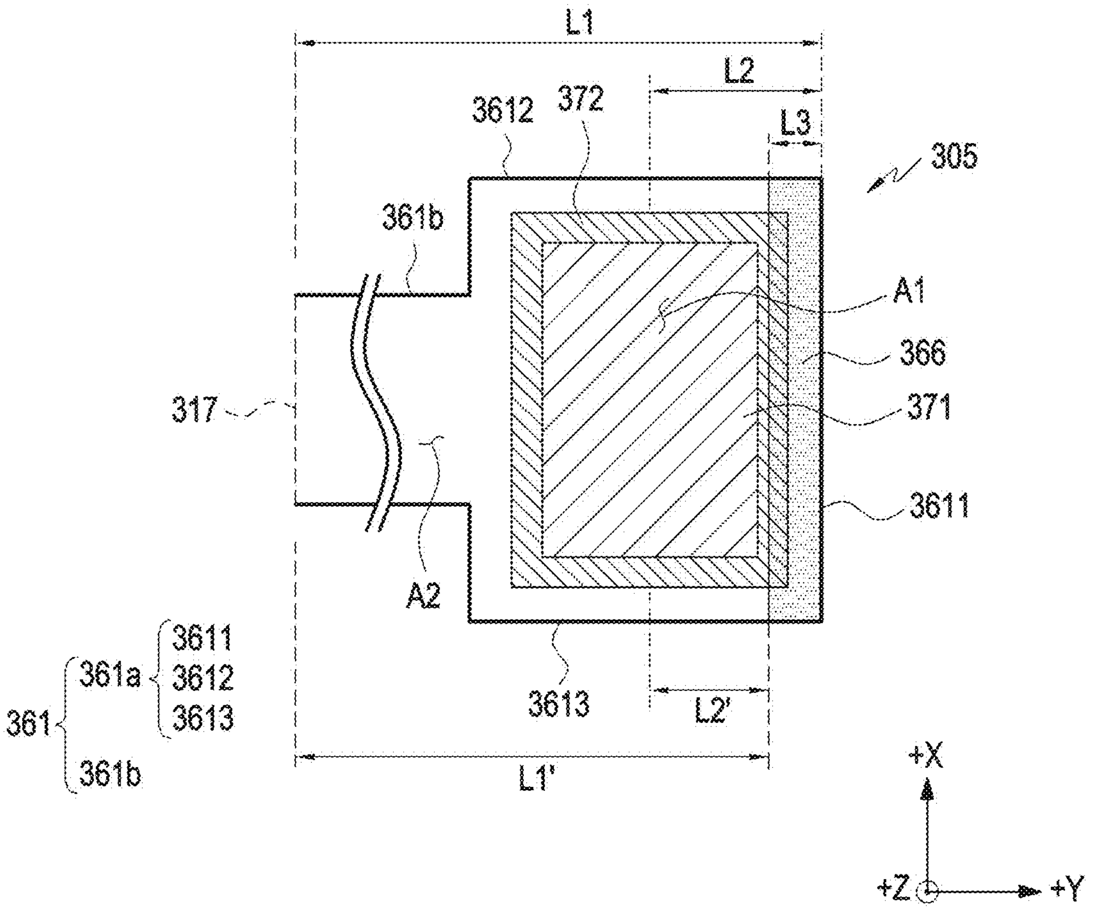
FIG. 11 is a plan view schematically illustrating a partial configuration of a speaker assembly of an electronic device according to an embodiment of the disclosure.
Figure 12:
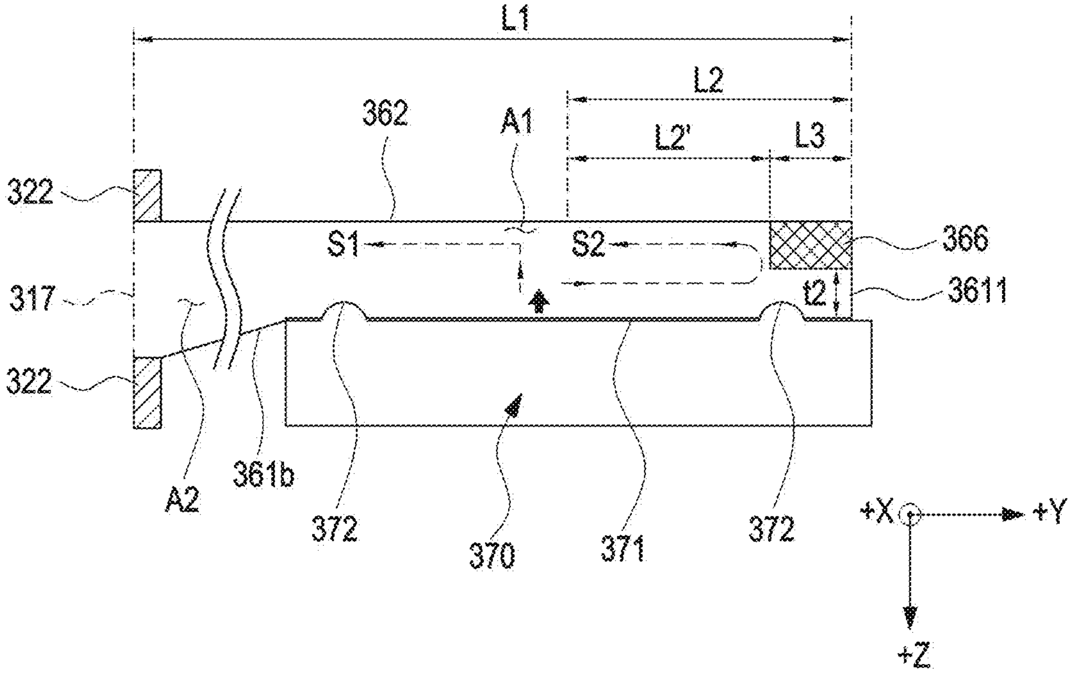
FIG. 12 is a side cross-sectional view schematically illustrating the speaker assembly of FIG. 11, according to an embodiment of the disclosure.
Figure 13:
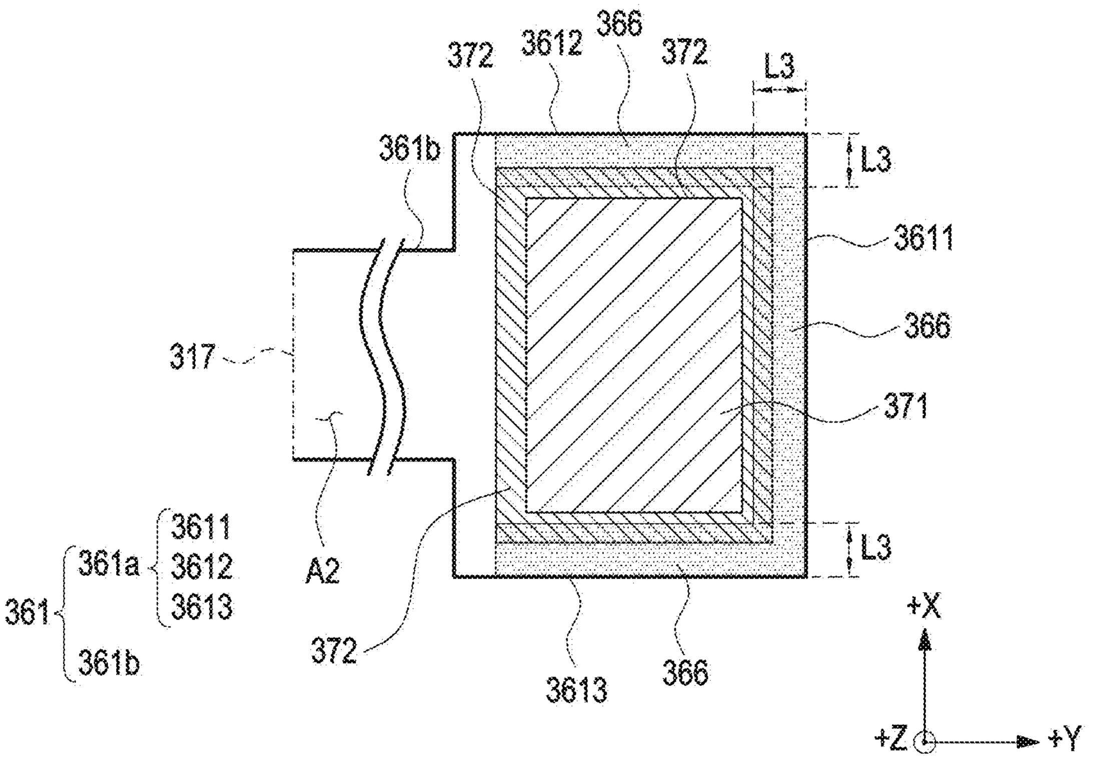
FIG. 13 is a plan view schematically illustrating a partial configuration of a speaker assembly of an electronic device according to an embodiment of the disclosure.
Figure 14:
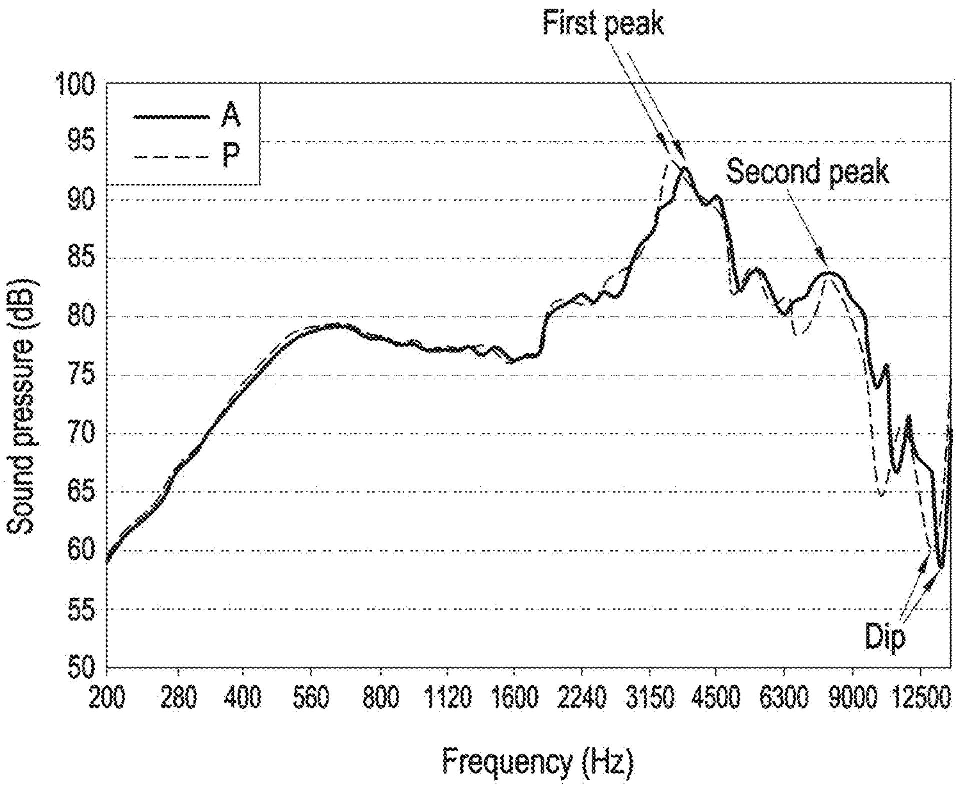
FIG. 14 is a graph illustrating changes in sound pressure according to frequencies by a step structure of a speaker assembly according to an embodiment of the disclosure.

FIG. 11 is a plan view schematically illustrating a partial configuration of a speaker assembly of an electronic device according to an embodiment of the disclosure. FIG. 12 is a side cross-sectional view schematically illustrating the speaker assembly of FIG. 11, according to an embodiment of the disclosure. FIG. 13 is a plan view schematically illustrating a partial configuration of a speaker assembly of an electronic device according to an embodiment of the disclosure. FIG. 14 is a graph illustrating changes in sound pressure according to frequencies by a step structure of a speaker assembly according to an embodiment of the disclosure.

The first speaker hole 317, the side frame 322, the first supporting structure 361, the first speaker cover 362, the step structure 366, the diaphragm 371, the suspension 372, the sound space A1, and the passage A2 illustrated in FIGS. 11, 12, and/or 13 may be referred to as the first speaker hole 317, the side frame 322, the first supporting structure 361, the first speaker cover 362, the step structure 366, the diaphragm 371, the suspension 372, the sound space A1, and the passage A2 of the embodiments of FIGS. 6, 7A, and 7B.

Referring to FIGS. 11 to 13, according to an embodiment, the step structure 366 may protrude from the surface of the first supporting structure 361 by a designated distance L3 (e.g., L3 of FIG. 7B). According to an embodiment, the step structure 366 may not overlap the diaphragm 371 but may overlap at least a portion of the suspension 372 when the first speaker cover 362 is viewed from above (or viewed in the +Z direction).

Referring to FIGS. 11 to 13, in an embodiment, the step structure 366 may at least partially face an open area formed on one side of the sound space A1 connected to the passage A2. In an embodiment, the first portion 361*a* (e.g., the first portion 361*a* of FIGS. 6, 7A, and 7B) of the first supporting structure 361 may include a first sidewall 3611 at least partially facing the open area formed on one side of the sound space A1 connected to the passage A2. According to an embodiment, the first supporting structure 361 may include a second sidewall 3612 extending from one end of the first sidewall 3611, and a third sidewall 3613 extending from the other end of the first sidewall 3611 and at least partially facing the second sidewall 3612. According to an embodiment, at least a portion of the step structure 366 may be disposed adjacent to a corner where the first sidewall 3611 and the first speaker cover 362 contact each other.

Referring to FIG. 13, according to an embodiment, the step structure 366 may extend from a portion disposed on the first sidewall 3611 to the second sidewall 3612 and/or the third sidewall 3613. Referring to FIG. 12, according to an embodiment, the step structure 366 may include a portion extending from a portion disposed on the first sidewall 3611 to the second sidewall 3612 and the third sidewall 3613. According to an embodiment, the step structure 366 disposed on the second sidewall 3612 may protrude from the second sidewall 3612 toward the third sidewall 3613 by a designated distance L3. According to an embodiment, the step structure 366 disposed on the third sidewall 3613 may protrude from the third sidewall 3613 toward the second sidewall 3612 by a designated distance L3. According to an embodiment, the step structure 366 disposed on the second sidewall 3612 and/or the third sidewall 3613 may not overlap the diaphragm 371 but may overlap at least a portion of the suspension 372 when the first speaker cover 362 is viewed from above (or viewed in the +Z direction). The shape or disposition of the step structure 366 illustrated in FIG. 13 may be changed. For example, the step structure 366 includes a portion extending from a portion disposed on the first sidewall 3611 to any one of the second sidewall 3612 or the third sidewall 3613. For example, the protruding length of the step structure 366 is at least partially shorter or longer than the designated length L3.

Referring to FIG. 12, in an embodiment, the sound (or sound waves or vibrations) output from the speaker 370 may travel in the first path S1 toward the first speaker hole 317 or may be reflected from the surface of the sidewall (e.g., the first sidewall 3611) of the first supporting structure 361 and travel in the second path S2 toward the first speaker hole 317. Here, the sound traveling in the first path S1 and the sound traveling in the second path S2 may cause destructive interference or constructive interference therebetween. When the sound traveling through the first path S1 and the second path S2 destructively interferes with each other, a dip (e.g., the dip of FIG. 14) may occur in a specific frequency band. According to an embodiment of the disclosure, the step structure 366 may adjust the frequency of the sound reflected by the step structure 366 and traveling in the second path S2 toward the first speaker hole 317 and the frequency at which destructive interference occurs. According to an embodiment, the step structure 366 may shift the specific frequency band in which the dip occurs to a high-frequency band as compared to the specific frequency band in which the dip occurs when the step structure 366 is not provided. It is possible to enhance the high-frequency band performance of the speaker assembly 305 by shifting the specific frequency band in which a dip occurs to a high-frequency band.

Referring to FIGS. 11 to 13, the first length L1 may be the distance from the first sidewall 3611 to the boundary between the sound space A1 and the passage A2, the second length L2 may be the distance from the first sidewall 3611 to the center of the diaphragm 371, and the designated distance L3 may be the distance from an end of the step structure 366 to the first sidewall 3611, or the distance at which the step structure 366 protrudes from the first sidewall 3611. Here, the first length L1, the second length L2, and the designated distance L3 may be linear distances measured with respect to the Y-axis.

In FIG. 14, the horizontal axis (X axis) may represent the frequency value (Hz) of the sound output from the speaker assembly 305, and the vertical axis (Y axis) may represent the magnitude (dB) of the response at the frequency value. In FIG. 14, graph A may show the response characteristic to the frequency of the speaker assembly 305 before adding the step structure 366 according to an embodiment of the disclosure. In FIG. 14, graph P may show the response characteristic to the frequency of the speaker assembly 305 adding the step structure 366 according to an embodiment of the disclosure.

Referring to FIG. 14, in graphs A and P, a first resonant frequency at which a first peak is generated and a second resonant frequency at which a second peak is generated by resonance of a sound (or sound wave or vibration) are displayed. Equation 1 below may represent the relationship between the wavelength of the resonant frequency and the length L1 (the first length L1 of FIGS. 11 to 13) from the first sidewall 3611 to the boundary between the sound space A1 and the passage A2. For example, in Equation 1, '$\lambda_{peak}$' denotes the wavelength of the first resonant frequency when n=1 and the wavelength of the second resonant frequency when n=2.

$$\lambda_{peak} = \frac{c}{f_{peak}} = \frac{4L_1}{2n-1}, \qquad \text{Equation 1}$$

(where, λ denotes the wavelength, f denotes the frequency, and c denotes the speed of sound in the medium.)

Equation 1 above is merely an example for helping understanding and, without limitations thereto, may be modified, applied, or expanded in various ways.

Referring back to FIG. 11, according to an embodiment, the fourth length L1' may be the distance from the center of the suspension 372 to the boundary between the sound space A1 and the passage A2. The fourth length L1 may be a value resulting from reducing the first length L1, which is the distance from the first sidewall 3611 to the boundary between the sound space A1 and the passage A2 by a designated distance L3 which is the distance to the first sidewall 3611 by adding the step structure 366 to the first supporting structure 361 According to an embodiment, the fifth length L2' may be the distance from the center of the suspension 372 to the center of the diaphragm 371. The fifth length L2' may be a value resulting from reducing the second length L2, which is the distance from the first sidewall 3611 to the center of the diaphragm 371 by the designated distance L3 which is the distance to the first sidewall 3611 by adding the step structure 366 to the first supporting structure 361. Here, the fourth length L1' and the fifth length L2' may be straight line distances measured with respect to the Y axis.

Referring to FIGS. 12 and 14, a dip may be generated in a specific frequency band due to destructive interference between the sounds (or vibrations) traveling in the first path S1 of FIG. 12 and the second path S2 of FIG. 12. Referring to FIG. 14, according to an embodiment, the frequency in which a dip occurs may be shifted to a high-frequency band by adding the step structure 366 to the first supporting structure 361. Referring to FIG. 11, according to an embodiment, the first length L1, which is the distance from the first sidewall 3611 to the boundary between the sound space A1 and the passage A2, may be reduced to the fourth length L1', and the second length L2, which is the distance from the first sidewall 3611 to the center of the diaphragm 371, may be reduced to the fifth length L2' by adding the step structure 366 to the first supporting structure 361. The fifth length L2' of FIG. 11 may be a value that affects a specific frequency band in which a dip occurs. According to an embodiment, it is possible to change the frequency of the sound (e.g., the sound traveling in the second path S2 of FIG. 12) reflected by the step structure 366 and its resultant specific frequency band in which a dip occurs as the step structure 366 reduces the second length L2 by the display distance L3. Equation 2 below may represent the relationship between the wavelength where a dip occurs and the fifth length L2'. It may be identified from Equation 2 that if the fifth length L2 is reduced by adding the step structure 366, the frequency $f_{dip}$ at which a dip occurs may be increased, i.e., shift to a high-frequency band.

$$\lambda_{dip} = \frac{c}{f_{dip}} = 4(L_2 - L_3) = 4L_2' \qquad \text{Equation 2}$$

(where, λ denotes the wavelength, f denotes the frequency, and c denotes the speed of sound in the medium.)

Equation 2 above is merely an example for helping understanding and, without limitations thereto, may be modified, applied, or expanded in various ways.

It may be identified from Equation 2 above and the graph of FIG. 14 that a specific frequency band in which a dip occurs in the speaker assembly 305 which adds the step structure 366 is shifted to a high-frequency band as compared with graph A before the step structure 366 is added according to an embodiment of the disclosure. Accordingly, the high-frequency band performance or sound quality of the speaker assembly 305 may be enhanced.

Figure 15A:
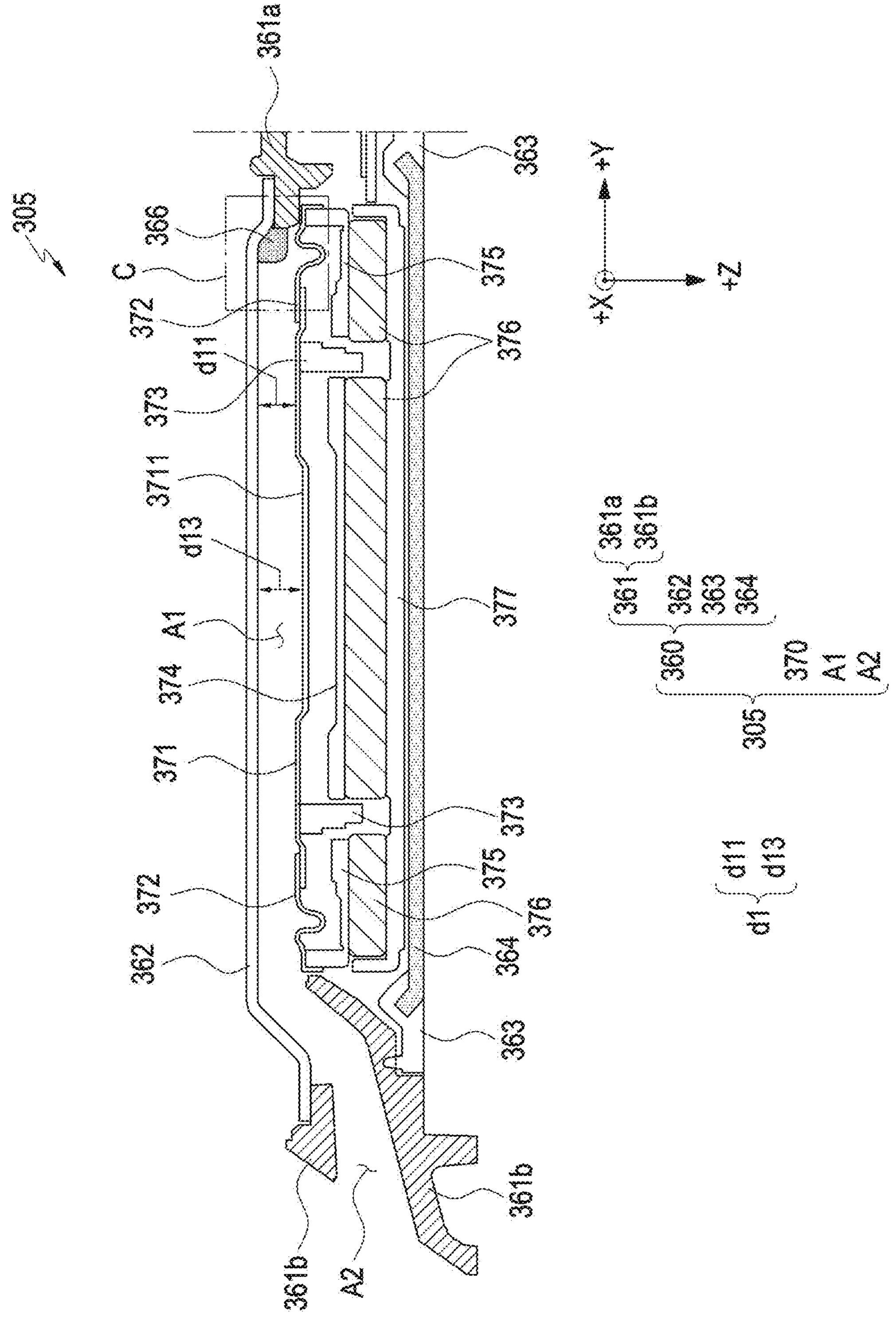
FIG. 15A is a side cross-sectional view illustrating an electronic device for describing a speaker assembly according to an embodiment of the disclosure.
Figure 15B:
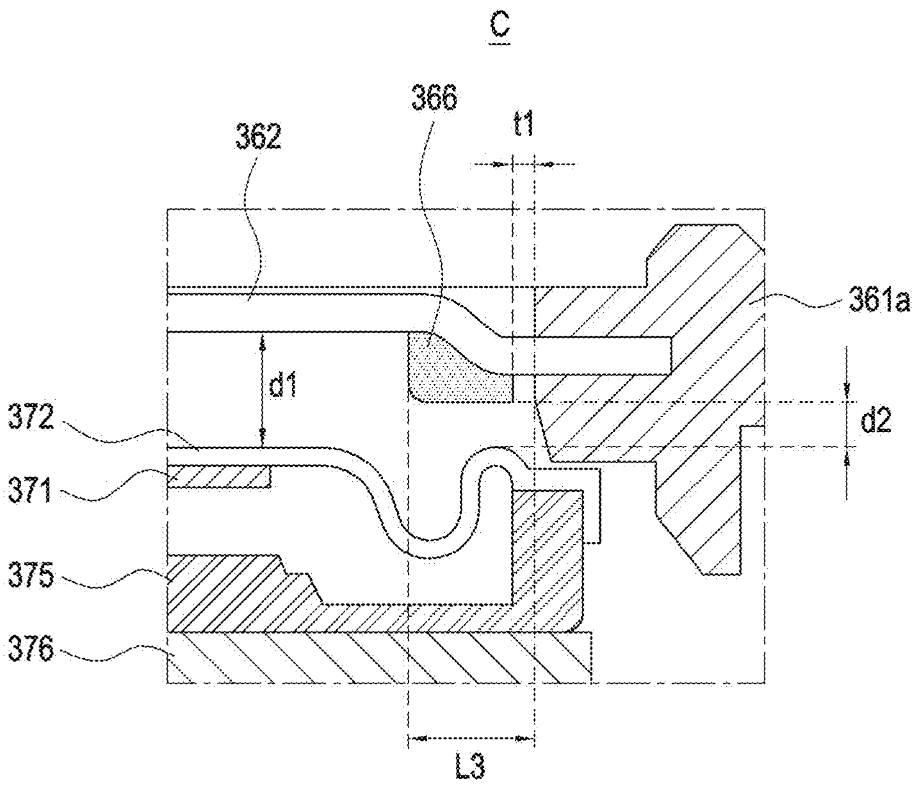
FIG. 15B is an enlarged view illustrating portion C of FIG. 15A according to an embodiment of the disclosure.

FIG. 15A is a side cross-sectional view illustrating an electronic device for describing a speaker assembly according to an embodiment of the disclosure. FIG. 15B is an enlarged view illustrating portion C of FIG. 15A according to an embodiment of the disclosure.

The speaker assembly 305 of FIGS. 15A and 15B may be referred to as the speaker assembly 305 of FIGS. 6, 7A, 8A, 8B, 9, and 10. The description described above with reference to FIGS. 11 to 14 may be applied substantially equally to the embodiments of FIGS. 15A and 15B. The following description may focus primarily on features of the step structure 366 of FIGS. 15A and 15B, different from those of the step structure 366 of the embodiments of FIGS. 6, 7A, 8A, 8B, 9, and 10, and a duplicate description of FIGS. 6, 7A, 8A, 8B, 9, and 10 may be omitted.

Referring to FIGS. 15A and 15B, in an embodiment, the step structure 366 may include a material different from that of the first supporting structure 361. For example, the first supporting structure 361 includes various materials such as synthetic resin or rubber. For example, the step structure 366 includes various materials such as metal (e.g., stainless steel), synthetic resin, or rubber. According to an embodiment, the step structure 366 may be manufactured separately from the first supporting structure 361 and may be connected to the first supporting structure 361. According to an embodiment, the step structure 366 may be integrally formed with the first supporting structure 361. For example, the first supporting structure 361 is integrally formed with the step structure 366 through various processes such as double injection molding or cutting.

Referring to FIG. 15B, according to an embodiment, the step structure 366 may be connected to the first supporting structure 361 and/or the first speaker cover 362. For example, the step structure 366 is disposed at a distance t1 from the first supporting structure 361. For example, the distance t1 between the step structure 366 and the first supporting structure 361 is a distance required in the manufacturing process, and is omitted as necessary. According to an embodiment, the step structure 366 may be disposed to contact the first supporting structure 361 without the distance t1, in which case the step structure 366 may protrude from a portion of the first supporting structure 361 by a designated distance L3.

In general, a speaker device may have progressive waves that are output from a diaphragm and travel toward a speaker hole and reflected waves that are reflected by a sidewall on the opposite side of the speaker hole and travel toward the speaker hole. The progressive waves and the reflected waves may destructively interfere with each other, and accordingly, a dip may occur in a specific frequency band. This dip may deteriorate the high-band performance of the speaker device.

Aspects of the disclosure are to address at least the above-described problems and/or disadvantages, and to provide at least the advantages described below.

According to an embodiment of the disclosure, a step structure may be added to the sidewall disposed on the side opposite to the speaker hole in the speaker assembly, so that the frequency of the reflection wave reflected by the sidewall may be changed, and the frequency band in which a dip occurs may be shifted to a high frequency band, thereby enhancing the high-frequency band performance of the speaker assembly.

The disclosure is not limited to the foregoing embodiments but various modifications or changes may rather be made thereto without departing from the spirit and scope of the disclosure. The effects that may be obtained from this disclosure are not limited to the effects mentioned above, and various effects that may be directly or indirectly identified through the disclosure may be provided.

According to an embodiment of the disclosure, an electronic device 101 may be provided. The electronic device may comprise a housing 210 including a first speaker hole 207; 317 and a speaker assembly 305 disposed in the housing and configured to radiate a sound to an outside of the electronic device through the first speaker hole. The speaker assembly may include a speaker 370 including a diaphragm 371, a first speaker cover 362 facing the diaphragm and spaced apart from the diaphragm, a sound space A1 formed between the diaphragm and the first speaker cover, a first supporting structure 361 including a first portion 361*a* formed to surround a portion of the sound space, and a step structure 366 disposed adjacent to an area where a portion of the first portion of the first supporting structure contacts the first speaker cover and disposed to be spaced apart from the speaker.

According to an embodiment, the step structure may be disposed not to overlap the diaphragm when viewed in a direction in which the speaker cover is viewed from thereabove.

According to an embodiment, the first supporting structure may further include a second portion 361*b* including a passage A2 connecting the sound space and the first speaker hole and extending from the first portion. The first portion of the first supporting structure may include a first sidewall 3611 at least partially facing the passage. At least a portion of the step structure may be disposed adjacent to an area where the first sidewall contacts the first speaker cover.

According to an embodiment, the step structure may be formed to protrude from a portion of the first sidewall to the passage by a designated distance L3.

According to an embodiment, a distance between the first sidewall and the diaphragm may be larger than the designated distance L3.

According to an embodiment, the first supporting structure may include a second sidewall 3612 extending from one end of the first sidewall and a third sidewall 3613 extending from another end of the first sidewall and facing the second sidewall.

According to an embodiment, the step structure may include a portion disposed on at least one of the second sidewall and the third sidewall.

According to an embodiment, the speaker may include a suspension 372 surrounding at least a portion of an edge of the diaphragm.

According to an embodiment, the step structure may be disposed to at least partially overlap the suspension and not to overlap the diaphragm when viewed in a direction in which the speaker cover is viewed from thereabove.

According to an embodiment, the speaker may be configured to linearly reciprocate to move the diaphragm close to or away from the first speaker cover when operated.

According to an embodiment, the suspension may be configured to linearly reciprocate along with the diaphragm. A range of the linear reciprocation of the suspension may be smaller than a range of the linear reciprocation of the diaphragm.

According to an embodiment, a distance between a position of the suspension when the speaker is not operated and a position where the suspension is moved close to the first speaker cover when the speaker is operated may be smaller than a distance d2 between the step structure and the speaker.

According to an embodiment, a minimum value of a distance d1 between the first speaker cover and the diaphragm may be larger than a minimum value of a distance d2 between the step structure and the speaker.

According to an embodiment, the step structure may be integrally formed with the first supporting structure.

According to an embodiment, the first supporting structure and the step structure may include different materials.

According to an embodiment of the disclosure, a speaker assembly 305 may be provided. The speaker assembly may include a speaker 370 including a diaphragm 371, a first speaker cover 362 facing the diaphragm and spaced apart from the diaphragm, a sound space A1 formed between the diaphragm and the first speaker cover, a first supporting structure 361 including a first portion 361*a* formed to surround a portion of the sound space and a second portion 361*b* including a passage A2 connecting the sound space and the first speaker hole and extending from the first portion, and a step structure 366 disposed adjacent to an area where a portion of the first portion of the first supporting structure contacts the first speaker cover and disposed to be spaced apart from the speaker.

According to an embodiment, the first portion of the first supporting structure may include a first sidewall 3611 at least partially facing the passage. At least a portion of the step structure may be disposed adjacent to an area where the first sidewall contacts the first speaker cover.

According to an embodiment, the step structure may be formed to protrude from a portion of the first sidewall toward the passage by a designated distance L3, and a distance between the first sidewall and the diaphragm may be larger than the designated distance L3.

According to an embodiment, the first supporting structure may include a second sidewall 3612 extending from one end of the first sidewall and a third sidewall 3613 extending from another end of the first sidewall and facing the second sidewall. The step structure may include a portion disposed on at least one of the second sidewall and the third sidewall.

According to an embodiment, the speaker may include a suspension 372 surrounding at least a portion of an edge of the diaphragm. The step structure may be disposed to at least partially overlap the suspension and not to overlap the diaphragm when viewed in a direction in which the speaker cover is viewed from thereabove.

According to an embodiment, the step structure may be disposed not to overlap the diaphragm when viewed in a direction in which the speaker cover is viewed from thereabove.

According to an embodiment, the first portion of the first supporting structure may include a first sidewall 3611 at least partially facing the passage. At least a portion of the step structure may be disposed adjacent to an area where the first sidewall contacts the first speaker cover.

According to an embodiment, the step structure may be formed to protrude from a portion of the first sidewall to the passage by a designated distance L3.

According to an embodiment, a distance between the first sidewall and the diaphragm may be larger than the designated distance L3.

According to an embodiment, the first supporting structure may include a second sidewall 3612 extending from one end of the first sidewall and a third sidewall 3613 extending from another end of the first sidewall and facing the second sidewall.

According to an embodiment, the step structure may include a portion disposed on at least one of the second sidewall and the third sidewall.

According to an embodiment, the speaker may include a suspension 372 surrounding at least a portion of an edge of the diaphragm.

According to an embodiment, the step structure may be disposed to at least partially overlap the suspension and not to overlap the diaphragm when viewed in a direction in which the speaker cover is viewed from thereabove.

According to an embodiment, the speaker may be configured to linearly reciprocate to move the diaphragm close to or away from the first speaker cover when operated.

According to an embodiment, the suspension may be configured to linearly reciprocate along with the diaphragm. A range of the linear reciprocation of the suspension may be smaller than a range of the linear reciprocation of the diaphragm.

According to an embodiment, a distance between a position of the suspension when the speaker is not operated and a position where the suspension is moved close to the first speaker cover when the speaker is operated may be smaller than a distance d2 between the step structure and the speaker.

According to an embodiment, a minimum value of a distance d1 between the first speaker cover and the diaphragm may be larger than a minimum value of a distance d2 between the step structure and the speaker.

According to an embodiment, the step structure may be integrally formed with the first supporting structure.

According to an embodiment, the first supporting structure and the step structure may include different materials.

According to an embodiment of the disclosure, a speaker assembly 305 may be provided. The speaker assembly may include a speaker 370 including a diaphragm 371, a first speaker cover 362 facing the diaphragm and spaced apart from the diaphragm, a sound space A1 formed between the diaphragm and the first speaker cover, a first supporting structure 361 including a first portion 361*a* formed to surround a portion of the sound space, and a step structure 366 disposed adjacent to an area where a portion of the first portion of the first supporting structure contacts the first speaker cover and disposed to be spaced apart from the speaker.

According to an embodiment, the first supporting structure may further include a second portion 361*b* including a passage A2 connecting the sound space and the first speaker hole and extending from the first portion. The first portion of the first supporting structure may include a first sidewall 3611 at least partially facing the passage. At least a portion of the step structure may be disposed adjacent to an area where the first sidewall contacts the first speaker cover.

According to an embodiment, the step structure may be formed to protrude from a portion of the first sidewall toward the passage by a designated distance L3, and a distance between the first sidewall and the diaphragm may be larger than the designated distance L3.

According to an embodiment, the first supporting structure may include a second sidewall 3612 extending from one end of the first sidewall and a third sidewall 3613 extending from another end of the first sidewall and facing the second sidewall. The step structure may include a portion disposed on at least one of the second sidewall and the third sidewall.

According to an embodiment, the step structure may include at least one of stainless steel, synthetic resin, or rubber.

According to an embodiment, the step structure may be manufactured separately from the first supporting structure and may be connected to the first supporting structure.

According to an embodiment, the first supporting structure may be integrally formed with the step structure through double injection molding or cutting.

According to an embodiment, the speaker may include a suspension 272 surrounding at least a portion of an edge of the diaphragm. The step structure may be disposed to at least partially overlap the suspension and not to overlap the diaphragm when viewed in a direction in which the speaker cover is viewed from thereabove.

It is apparent to one of ordinary skill in the art that the speaker assembly and the electronic device including the speaker assembly of the disclosure as described above are not limited to the above-described embodiments and those shown in the drawings, and various changes, modifications, or alterations may be made thereto without departing from the scope of the disclosure.

While the disclosure has been described and shown in connection with an embodiment, it should be appreciated that an embodiment is intended as limiting the disclosure but as illustrative. It will be apparent to one of ordinary skill in the art that various changes may be made in form and detail without departing from the overall scope of the disclosure, including the appended claims and their equivalents.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module is implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) invokes at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
- a housing including a first speaker hole; and
- a speaker assembly disposed in the housing and configured to radiate a sound to an outside of the electronic device through the first speaker hole,
- wherein the speaker assembly includes:
  - a speaker including a diaphragm,
  - a first speaker cover facing the diaphragm and spaced apart from the diaphragm,
  - a sound space formed between the diaphragm and the first speaker cover,
  - a first supporting structure including a first portion formed to surround a portion of the sound space, and
  - a step structure disposed adjacent to an area where a portion of the first portion of the first supporting structure contacts the first speaker cover and disposed to be spaced apart from the speaker, and
- wherein the first portion includes a first sidewall, the step structure protrudes from the first sidewall toward a passage by a designated distance, and a distance between the first sidewall and the diaphragm is larger than the designated distance.

2. The electronic device of claim 1, wherein the step structure is disposed not to overlap the diaphragm when the speaker assembly is viewed from thereabove.

3. The electronic device of claim 1,
- wherein the first supporting structure further includes a second portion extending from the first portion and including a passage connecting the sound space and the first speaker hole,
- wherein the first portion of the first supporting structure includes at least partially facing the passage, and
- wherein at least a portion of the step structure is disposed adjacent to an area where the first sidewall contacts the first speaker cover.

4. The electronic device of claim 3, wherein the step structure is formed to protrude from a portion of the first sidewall to the passage by a designated distance.

5. The electronic device of claim 4, wherein the first supporting structure includes:
- a second sidewall extending from one end of the first sidewall, and
- a third sidewall extending from another end of the first sidewall and facing the second sidewall.

6. The electronic device of claim 5, wherein the step structure includes a portion disposed on at least one of the second sidewall and the third sidewall.

7. The electronic device of claim 6, wherein the speaker includes a suspension surrounding at least a portion of an edge of the diaphragm.

8. The electronic device of claim 7, wherein the step structure is disposed to at least partially overlap the suspension and not to overlap the diaphragm when the speaker assembly is viewed from thereabove.

9. The electronic device of claim 8, wherein the speaker is configured to linearly reciprocate to move the diaphragm close to or away from the first speaker cover when operated.

10. The electronic device of claim 9,
- wherein the suspension is configured to linearly reciprocate along with the diaphragm, and
- wherein a range of the linear reciprocation of the suspension is smaller than a range of the linear reciprocation of the diaphragm.

11. The electronic device of claim 10, wherein a distance between a position of the suspension when the speaker is not operated and a position where the suspension is moved close to the first speaker cover when the speaker is operated is smaller than a distance between the step structure and the speaker.

12. The electronic device of any one of claim 11, wherein a minimum value of a distance between the first speaker cover and the diaphragm is larger than a minimum value of the distance between the step structure and the speaker.

13. The electronic device of claim 12, wherein the step structure is integrally formed with the first supporting structure.

14. The electronic device of claim 13, wherein the first supporting structure and the step structure include different materials.

15. A speaker assembly comprising:
- a speaker including a diaphragm;
- a first speaker cover facing the diaphragm and spaced apart from the diaphragm;
- a sound space formed between the diaphragm and the first speaker cover;
- a first supporting structure including a first portion formed to surround a portion of the sound space; and
- a step structure disposed adjacent to an area where a portion of the first portion of the first supporting structure contacts the first speaker cover and disposed to be spaced apart from the speaker,
- wherein the first portion includes a first sidewall, the step structure protrudes from the first sidewall toward a passage by a designated distance, and a distance between the first sidewall and the diaphragm is larger than the designated distance.

16. The speaker assembly of claim 15,
- wherein the first supporting structure includes a second portion extending from the first portion and including a passage connecting the sound space and a first speaker hole,
- wherein the first sidewall at least partially faces the passage, and
- wherein at least a portion of the step structure is disposed adjacent to an area where the first sidewall contacts the first speaker cover.

17. The speaker assembly of claim 16,
- wherein the first supporting structure includes:
  - a second sidewall extending from one end of the first sidewall, and a third sidewall extending from another end of the first sidewall and facing the second sidewall, and wherein the step structure includes a portion disposed on at least one of the second sidewall and the third sidewall.

18. The speaker assembly of claim 17, wherein the speaker includes a suspension surrounding at least a portion of an edge of the diaphragm, and wherein the step structure is disposed to at least partially overlap the suspension and not to overlap the diaphragm when the speaker cover is viewed from thereabove.

* * * * *